(12) United States Patent
Gardner

(10) Patent No.: US 12,055,750 B2
(45) Date of Patent: *Aug. 6, 2024

(54) BACKLIGHTED SURFACE COVERING

(71) Applicant: Hyperform, Inc., Rockledge, FL (US)

(72) Inventor: Jason Gardner, Melbourne Beach, FL (US)

(73) Assignee: Hyperform, Inc., Rockledge, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,364

(22) Filed: Jul. 31, 2023

(65) Prior Publication Data

US 2023/0408749 A1    Dec. 21, 2023

Related U.S. Application Data

(63) Continuation-in-part of application No. 17/349,850, filed on Jun. 16, 2021, now Pat. No. 11,814,142.

(60) Provisional application No. 63/051,753, filed on Jul. 14, 2020, provisional application No. 63/039,708, filed on Jun. 16, 2020.

(51) Int. Cl.
*F21V 8/00*  (2006.01)
*B63B 45/06*  (2006.01)

(52) U.S. Cl.
CPC ............ *G02B 6/0058* (2013.01); *B63B 45/06* (2013.01); *G02B 6/0086* (2013.01); *B63B 2231/50* (2013.01)

(58) Field of Classification Search
CPC .......................... B63B 45/06; B63B 2231/50
See application file for complete search history.

(56) References Cited

U.S. PATENT DOCUMENTS

| | | |
|---|---|---|
| 5,848,830 A | 12/1998 | Castle et al. |
| 6,481,877 B1 | 11/2002 | Bello |
| 6,718,576 B1 | 4/2004 | Shih |
| 7,144,139 B2 | 12/2006 | Kramer et al. |
| 8,021,014 B2 | 9/2011 | Jacobsson |
| 8,905,571 B2 | 12/2014 | Sigler |
| 9,476,551 B2 | 10/2016 | Thijssen et al. |
| 9,920,921 B2 | 3/2018 | Furmanek |
| 10,578,298 B2 | 3/2020 | Knight |
| 2007/0103902 A1 | 5/2007 | Hsiao |
| 2007/0258255 A1 | 11/2007 | Kessler et al. |
| 2011/0310595 A1 | 12/2011 | Hardesty |
| 2014/0254158 A1 | 9/2014 | Mangus |
| 2017/0362840 A1 | 12/2017 | Paul et al. |
| 2018/0153328 A1 | 6/2018 | Girard |
| 2018/0299115 A1 | 10/2018 | Coelho |

(Continued)

*Primary Examiner* — Alexander K Garlen

(74) *Attorney, Agent, or Firm* — Price Heneveld LLP

(57) ABSTRACT

A lighting system includes a base structure comprising a transparent or translucent material, a surface covering including a first surface layer, a second surface layer having a first surface facing a second surface of the first surface layer and a second surface facing a first surface of the base structure, and at least one light source disposed to as to illuminate at least a portion of the base structure with light energy such that at least a portion of the light energy passes through the at least a portion of the base structure and into the surface covering, and wherein the surface covering includes a void extending at least partially between the first surface of the first surface layer and the second surface of the second surface layer and configured to allow at least some of the light energy passing through the base structure to pass through the void.

31 Claims, 20 Drawing Sheets

(56) References Cited

U.S. PATENT DOCUMENTS

| | | |
|---|---|---|
| 2019/0054996 A1 | 2/2019 | Ibrahim et al. |
| 2019/0151697 A1 | 5/2019 | Yen et al. |
| 2020/0036205 A1 | 1/2020 | Hakla et al. |
| 2020/0056766 A1 | 2/2020 | Wheatley et al. |

BACKLIGHTED SURFACE COVERING

CROSS REFERENCE TO RELATED APPLICATIONS

This application is a continuation-in-part of U.S. patent application No. 17/349,850, filed Jun. 16, 2021, entitled "BACKLIGHTED SURFACE COVERING," which claims benefit of priority to, U.S. Provisional Patent Application No. 63/039,708, filed Jun. 16, 2020, entitled "LIGHTED DECKING WITH OVERLAY," and claims benefit of priority to U.S. Provisional Patent Application No. 63/051,753, filed Jul. 14, 2020, entitled "BACKLIGHTED SURFACE COVERING," the entire disclosures of which are incorporated herein by reference in their entireties.

BACKGROUND OF THE INVENTION

The field of the invention relates generally to systems and methods for backlighting or lighting any desired surface, for example, a surface of a boat, watercraft, automobile, or any other vehicle; kayak spa, swim spa; building or architectural surface; pool; pool or patio deck; cooler or any other desired surface on any structure using backlighting or edge lighting such that decorative or other desired visual or effects may be created by forming voids in a surface covering, or overlay, that is applied to the surface or structure to be lighted, allowing light, such as, for example, light produced by backlighting or edge lighting, to pass through or around portions of the surface covering or overlay material. The surface covering or overlay material, such as surface covering 200, may be any light-blocking or partially light-blocking material. In an exemplary, non-limiting embodiment of the system and method of the invention, the system may comprise a base structure. The base structure may comprise a transparent or translucent base or lighting material that is able to transmit light therethrough, allowing at least a portion of light impinging (i.e., incident) on a surface of the base structure from a lit side of the base or lighting structure, or light that is generated within the base or lighting structure, to pass through the base structure and to emanate from a first, or upper, or non-lit or non-light-incident, side of the base structure, where the light may be blocked by, partially blocked by, or allowed to pass through the surface covering to the non-lit side of the apparatus (the surface covering being depicted as item 200 depicted in the figures) such that any desired pattern, outline, shape or visual effect is achieved. In embodiments, the surface covering material may be EVA or PE foam material such as may be used to provide a non-skid, cushioning or other covering for the boat surfaces. In embodiments, the overlay or surface covering may be attached to a first surface of the decking by chemical adhesion using chemical adhesives. While the specific case of boat applications and signage may be depicted in the drawings, the system and method of the invention includes within its scope application to any receiving structure for which lighting may be required or desired such as, for example, boat structures, pool surfaces, cooler surfaces, pool decking, jet ski surfaces, paddleboard surfaces, spa surfaces, recreational vehicle surfaces, golf cart surfaces, building and architectural surfaces, trailer surfaces and so on.

Flexible substrates, such as, for example, ethylene-vinyl acetate (EVA) foam, PE foam or EPDM are used as overlay and surface covering material for numerous uses and applications including marine, spa, recreational and other applications. For example, surface covering materials in the form of traction pads comprising materials such as closed cell EVA foam, PE foam or EPDM are applied to boat decks and other surfaces such as boat swim platforms, boat floor surfaces, boat helm stations, spas, kayaks, architectural surfaces, recreational vehicles, golf carts, kayaks, coolers, utility and livestock trailers, and watercraft to provide a padded, non-skid surface that is comfortable for a user to walk on or to rest against. In many of these applications, the vehicle, boat, recreational vehicle or other structure upon which the surface covering material is attached may be utilized in the darkness of night or in low light conditions. In such situations it is often desirable to provide lighting for safety or aesthetic purposes. Further, it may be desirable in some applications that any light produced be of low enough intensity so as to not impair the night vision of the user. This would be the case, for example, in the situation in which the base is applied to the decking of a boat being operated at night. In such a situation it may be desirable that there be enough low level light present to prevent tripping from fishing or other gear in the boat, but not so much light as to impair the night vision of the operator so that the operator is still able to navigate the boat and to observe navigational markers and hazards in the water. The system and method of the invention are operable to provide such lighting, and, in embodiments, to provide such lighting in a controllable manner such that the intensity of light energy, the color of light energy, or both are controllable by a user. Likewise, other vehicles or equipment, such as golf carts or spas, are often utilized at night or in other low-light conditions and in such cases, it may be desired for safety or aesthetic reasons that some level of light be present to prevent injury to a user.

What is needed in the art, therefore, is an apparatus and/or method adapted to providing lighted surface coverings for boats, recreational vehicles, swim spas, conventional spas, pool decks and surfaces, golf carts, kayaks, watercraft, building floors and walls, and any other structure or surface such that soft low level lighting is provided to a user.

BRIEF SUMMARY OF THE INVENTION

The present invention comprises an apparatus and method that has one or more of the following features and/or steps, which alone or in any combination may comprise patentable subject matter.

In accordance with one embodiment of the present invention, the invention may comprise a flooring, architectural, decking, decorative, structural or other surface covering made from PE, EVA, EPDM or other overlay material with negative spaces, or cut outs from which surface covering material has been removed, at least partially cut, molded or routed into the overlay (surface covering) material, in some cases exposing at least a portion of a translucent or transparent base structure below that is illuminated either from within the base structure, below the base structure or from an edge or edges of the base structure, creating a desired lighted effect when viewed from the overlay side of the structure.

In embodiments, the overlay, or surface covering, material may comprise materials having a non-skid nature such as, but not limited to, EVA or PE foam, or other foam material, or EPDM, providing safe, comfortable flooring, decking or aesthetic surface covering, or overlay. The light source(s) may be present in any number and may be any light source such as Light Emitting Diodes (LEDs), lasers, incandescent lighting sources, or any other source of light of an intensity great enough to transfer light energy through the translucent or transparent material layer. Areas of the overlay material may be completely free, or partially free, of the overlay material allowing light energy to pass unobstructed or partially obstructed. In some embodiments, portions of the overly material may be reduced to such a thickness, for example, and not by way of limitation, less than 1 mm, that light may pass through the overlay material as well as the composite material layer. The material may be either flat or may comprise curved cross section along any axis, forming a three-dimensional surface of any desired shape or cross section.

In embodiments, the light may comprise any color, and the light may change color over time in patterns, or randomly, or in time with external signals such as the beat of music or other audio signals.

The invention may be utilized to provide any desired level of lighting to any structure. As a non-limiting example, the invention may form a part of, or may be applied to, a boat deck that provides a low level of lighting while operating a boat at night, allowing users to have enough illumination to see around the interior of the boat in order to avoid tripping or to locate objects, while not interfering with the night vision of the boat operator. In another non-limiting example of use, the invention may for a part of, or be applied to, surfaces of a spa for providing decorative, mood or safety lighting.

The lighting provided by the invention may be of any desired color, design pattern or time varying effect, and may provide an ornamental effect, a decorative effect, a product branding effect or any other desired effect.

In embodiments the invention comprises a lighting system, comprising a base structure having a first surface and a second surface, the base structure comprising a transparent or translucent material, a surface covering having a first surface and a second surface, the surface covering second surface disposed so as to be in contact with at least a portion of the base structure, at least one light source disposed to as to illuminate the at least a portion of the base structure with light energy such that at least a portion of the light energy passes through at least a portion of the base structure; wherein the surface covering comprises one or more surface voids in the surface covering first surface, the voids allowing at least some of the light energy passing through the base structure to pass through the one or more surface voids in the surface covering so as to emanate from the surface covering voids, creating a desired visual effect.

In embodiments the surface covering second surface may be chemically bonded to the base structure first surface, for example by pressure sensitive adhesive.

In embodiments the base structure may be adapted to be received by a receiving structure such as a boat, an automobile, a jet ski, a golf cart, a cooler, a paddleboard, a trailer, a spa, a swim spa, a pool, a deck or any other structure to which it is desired to attach a lighting system.

In embodiments the at least one light source may be a plurality of light sources of any number.

In embodiments the light sources may be light emitting diodes.

In embodiments the one or more voids, which may be a plurality of voids of any number, may form a desired visual pattern in the first surface of the surface covering.

In embodiments the surface covering may comprise any material, but may be a material selected from the group consisting of EVA foam, PE foam and EPDM.

In embodiments the least one light source is disposed so as to illuminate at least a portion of the second surface of the base structure with light energy.

In embodiments the light source(s) may be contained within a light box comprising a housing having an interior volume having an opening oriented towards the base structure second surface, and wherein the light box comprises a periphery that is in contact with and attached to the base structure second surface, forming a peripheral attachment between the second surface of the base structure and the light box periphery.

In embodiments the peripheral attachment of the second surface of the base structure to the light box periphery may be continuous and may form a watertight or fluid tight enclosure comprised of the second surface of the base structure and the light box housing, preventing the entry of water or other fluids into the interior volume of the light box.

In embodiments the light box interior volume may comprise an interior surface having a reflective coating such that light emitted from the light source(s) is at least partially reflected towards the base structure second surface or other surface of the base structure.

In embodiments the base structure may further be defined as a sheet structure having an edge and thickness, and wherein the light source(s) are further defined as being disposed so as to illuminate at least a portion of the edge of the base surface with light energy.

In embodiments the at least one light source may be disposed in a void formed in the second surface of the base structure.

In embodiments the light source(s) may be controllable as to the wavelength of the light energy radiated from the light source(s) and wherein the light source(s) are in communication with a controller for controlling the wavelength of the light energy radiated from the light source(s).

In embodiments the controller may be in communication with a mobile device, such as a smart phone or tablet having a processor, and the mobile device may be adapted to accept user input and to communicate user commands to the controller for controlling a wavelength of the light energy radiated from the at least one light source.

In embodiments the controller may further be adapted to receive an audio signal, and to control a wavelength of the light energy radiated from the at least one light source proportional to the audio signal.

In embodiments the light source(s) may be controllable as to the intensity of the light energy radiated from the light source(s) and the light source(s) may be in communication with a controller for controlling the intensity of the light energy radiated from the light source(s).

In embodiments the controller may be in communication with a mobile device, and the mobile device may be adapted to accept user input and to communicate user commands to the controller via a radio frequency link for controlling the intensity of the light energy radiated from the light source(s).

In embodiments the controller may further be adapted to receive an audio signal, and to control the intensity of the light energy radiated from the light source(s) proportional to the audio signal.

In embodiments the invention may comprise a lighting system, that comprises a base structure comprising a sheet having a thickness, a first surface and a second surface, a surface covering having first surface and a second surface, the surface covering second surface in contact with the base structure first surface, at least one or a plurality of light sources disposed in at least one or a plurality of voids in the second surface of the surface covering, the light source(s) disposed in such a manner so as to radiate light energy in the direction of the first surface of the surface covering such that at least a portion of the light energy emanates from the first surface of the surface covering to achieve a desired visual effect.

In embodiments the surface covering first surface may be chemically bonded to the lighting structure first surface. The chemical bonding may further be defined as comprising pressure sensitive adhesive sheet material.

In embodiments the lighting system may be adapted to be received by a receiving structure such as a boat, an automobile, a jet ski, a golf cart, a cooler, a paddleboard, a trailer, a spa, a swim spa, a pool, a deck or any other structure for which lighting or another visual effect is desired.

In embodiments the at least one light source is further defined as a plurality of light sources.

In embodiments the at least one light source may be an LED.

In embodiments the one or more voids may form a pattern such that the light energy emanating from the first surface of the surface covering forms a desired visual effect.

In embodiments the surface covering comprises material selected from the group consisting of EVA foam, PE foam and EPDM.

In embodiments the invention may comprise a lighting system for a boat swim platform, that comprises a boat swim platform and a lighting system, that comprises a base structure having a first surface and a second surface, the base structure comprising a transparent or translucent material, a surface covering having a first surface and a second surface, the surface covering second surface disposed so as to be in contact with at least a portion of the base structure, at least one light source disposed to as to illuminate the at least a portion of the base structure with light energy such that at least a portion of the light energy passes through at least a portion of the base structure, and wherein the surface covering comprises one or more voids in the surface covering first surface, the one or more voids allowing at least some of the light energy passing through the base structure to pass through the one or more surface voids in the surface covering so as to emanate from the surface covering voids, creating a desired visual effect.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

In the figures, like callouts refer to like elements or features.

Figure 1A:
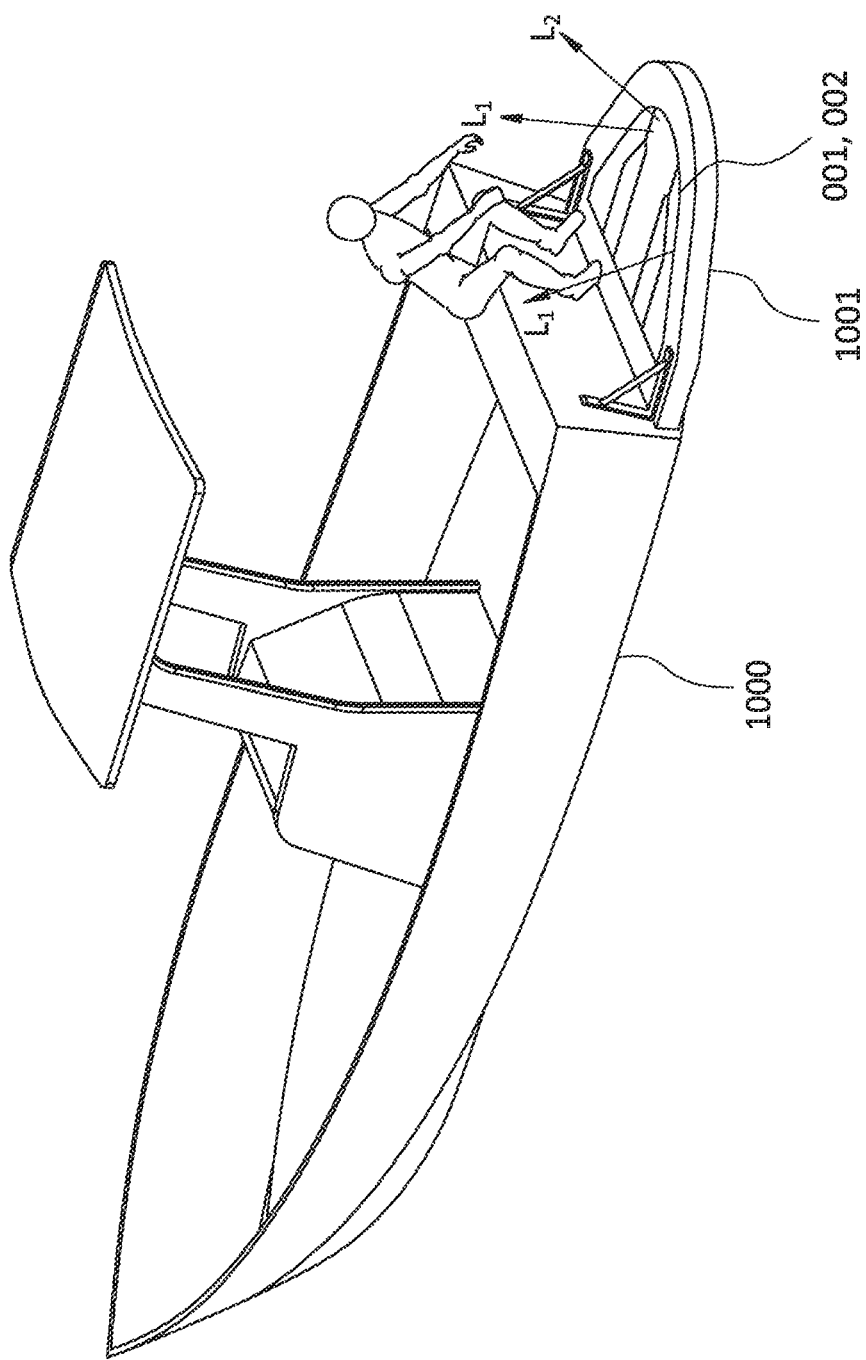
FIG. 1A depicts a perspective view of a boat having a swim deck comprising an embodiment of the lighted surface apparatus of the invention.
Figure 1B:
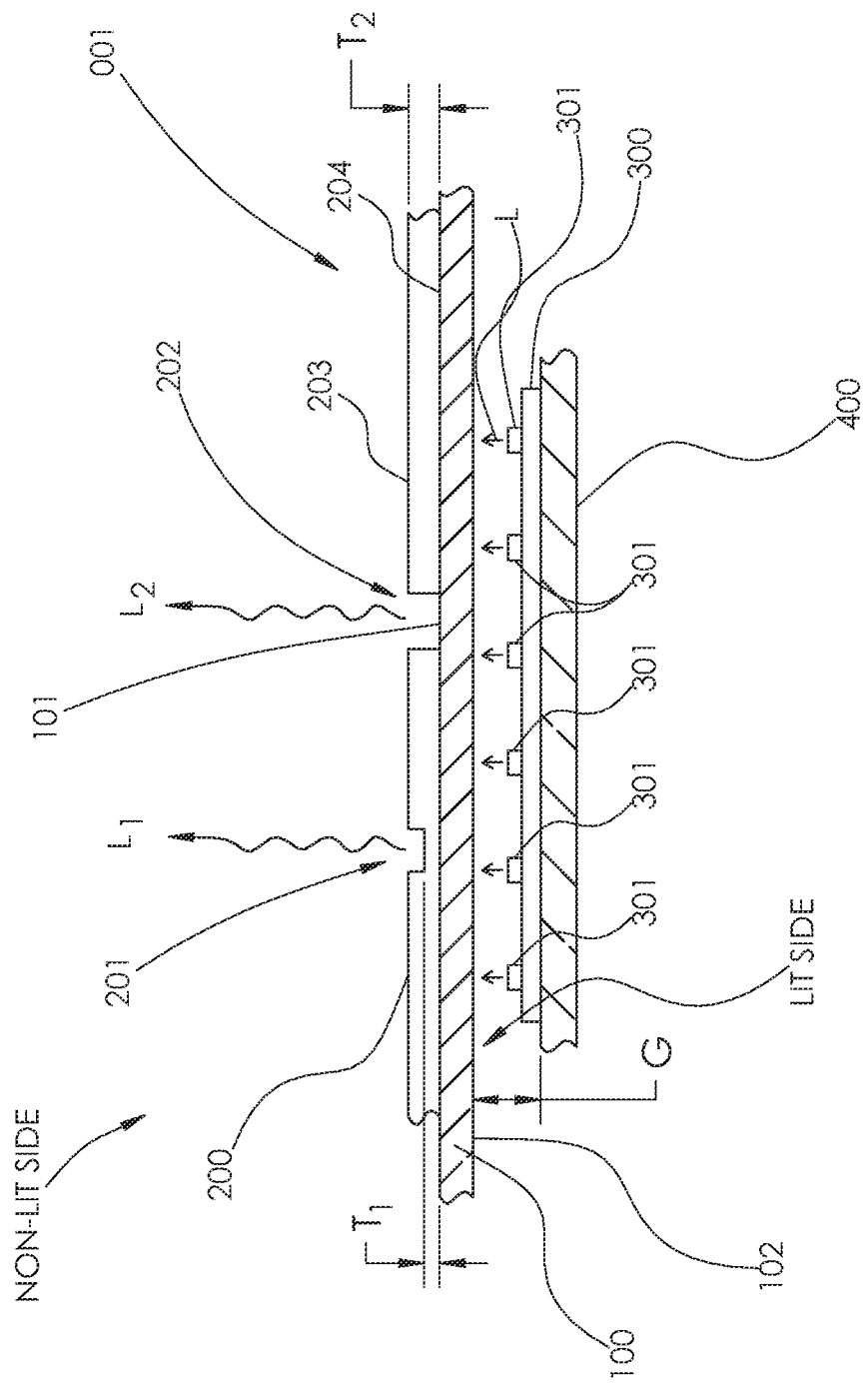
FIG. 1B depicts a cross section view of an embodiment of the invention in which the light sources are disposed proximal to an underneath surface of the base structure.
Figure 2:
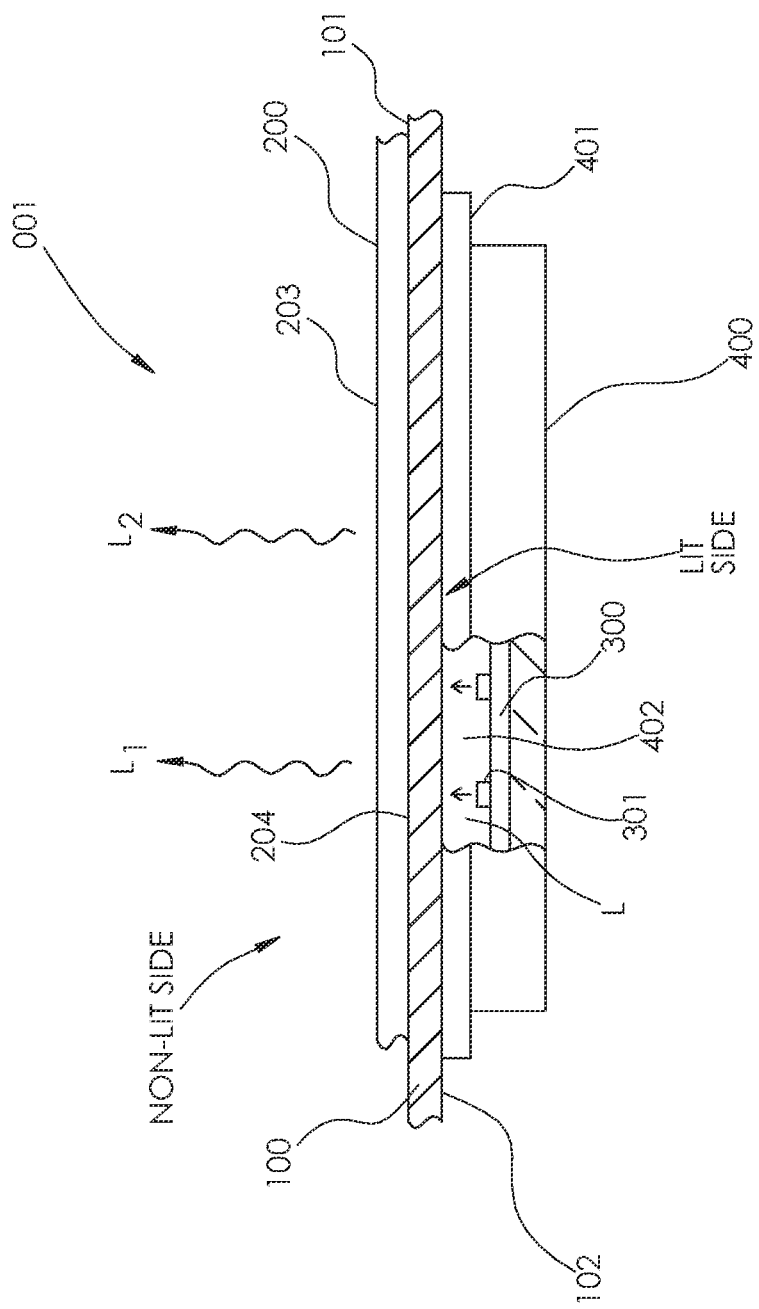
FIG. 2 depicts a cross section view of an embodiment of the invention in which the light sources are disposed proximal to an underneath surface of the base structure, and in which the light sources are disposed within a light box.

In the various embodiments of the invention, any of the described features may be present in any number and in any combination.

DETAILED DESCRIPTION OF THE INVENTION

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As used herein, when used to define the location of a light source relative to a structure, "proximal to" and "in proximity" mean that the light source is close enough to the structure that light transmitted by the light source in the direction of the structure creating a lit side of the structure is able to pass through the structure so as to be visible as observed from a non-lit side of the structure. In exemplary, non-limiting embodiments, up to half of the light energy from the light source impinging on the lit side of the structure in the areas of the voids 201 or 202 is able to pass through the structure and to be transmitted through a non-lit side of the structure such that it is visible from the non-lit side of the structure.

As used herein, "backlighting" means the lighting of a surface or structure, creating a lit, or energy incident side", that, in embodiments, is not generally the side that a user would observe in normal operation or use of the product or structure that is backlighted. In the embodiments of the invention, the product or structure, such as base structure 100, may be at least partially transparent or translucent. In embodiments, a user making normal use of a backlighted product or structure would generally observe the product or structure from a non-lit side. In such cases, light energy would appear to the user to emanate from the product or structure when the product or structure is backlighted, because light energy from light sources on the lit, or energy incident side, would pass through the product or structure and emanate towards the user who is observing from the non-lit side of the product or structure.

As used herein, "EVA" includes within its meaning ethylene-vinyl acetate. In embodiments, EVA material may be in sheet form.

As used herein "PE" includes within its meaning polyethylene. In embodiments, PE material may be in sheet form.

As used herein, "EPDM" includes within its meaning ethylene propylene diene monomer rubber, and any type of synthetic rubber. In embodiments, EPDM material may be in sheet form.

As used herein, "non-skid surface covering" or "surface covering" includes within their meanings EVA and PE foam materials, which may be in sheet form, and EPDM. "Non-skid surface covering" or "surface covering" also include within their meanings a multi-sheet structure that may be comprised of any number of sheets of EVA foam, PE foam or EPDM, in any combination.

As used herein, "non-lit" and "non-lit side" means a side of the structure from which light energy, such as $L_1$, $L_2$, $L_3$ or $L_4$ may emanate or radiate when light sources 301 are active to radiate light energy. Thus, the non-lit side of the structure, which may generally be the side of the structure which a user would observe in normal operation, appears to be lighted as light energy that is incident on the lit side of the structure is transmitted through base structure 100 and, in embodiments, through voids 201 or 202, or, in embodiments, through the surface covering 200 itself. In other words, the non-lit side is generally a non-incident-energy side. In embodiments, it may be possible that some light energy, such as ambient, environmental, or other light energy, may impinge or be incident on a non-lit side. In such cases, it is understood that the light energy that passes from the lit side of the structure through the base structure and emanates from the base structure, such as the light energy depicted by $L_1$, $L_2$, $L_3$ or $L_4$ in the figures, is of sufficient intensity to be observed by a user positioned on the non-lit side of the structure, even though some amount of ambient, environmental, or other light energy may impinge or be incident on the non-lit side of the structure.

As used herein, "lit" and "lit side" mean a side of the structures which receives light energy from light sources 301, and is thus "lit" by light sources 301. i.e. the lit side is an incident-energy side.

As used herein, "productized" means that an apparatus is able to be fully assembled at its place of manufacture and shipped to the site where it will be installed, in embodiments, without requiring assembly at the installation site other than attaching the productized apparatus to the intended surface and then routing and connecting wiring for electrical power, if necessary.

As used herein "translucent" and "transparent" materials include within their meanings any material that can pass all or a portion of light energy incident upon them Translucent and transparent materials include but are not limited to polycarbonate, lexan, polypropylene, acrylic or other polymer or composite materials.

As used herein, "visible spectrum" and "visible wavelength range" of light energy includes within its meaning light in the range from 300 nanometers to 1100 nanometers.

Referring now to FIGS. 1A, 1B, 2 and 4, exemplary backlighted embodiments of the system for providing lighting for a surface 001 is depicted. A base structure 100 having a first surface 101 and a second surface 102 that may form a part of, or be attached or adjacent to, a receiving structure 500, which may be, by way of example only, a portion of a structure of boat, automobile, cooler, golf cart, jet ski, kayak, spa, or any other structure to which it is desired to attach a lighting system, the receiving structure having an upper surface 501. Base structure 100 may have a first surface 101 and a second surface 102. In embodiments, base structure 100 may be inserted into structure 500 as depicted by detail 1A in FIG. 4 such that surface 501 and 101 are substantially flush. An overlay material, which may be, for example, and not by way of limitation, a surface covering, such as for example a non-skid surface covering, 200, having first surface 203 and a second surface 204 may be adjacent to the first surface 101 of base structure 100. The surface covering 200 second surface 204 may be in nominal contact with, or may be attached to, the base structure first surface 101. Such attachment may be via chemical bonding, such as, for example, pressure sensitive adhesive film.

In FIG. 1A, an exemplary use case, or application, in which an embodiment of a lighting apparatus of the invention 001 has been installed on a swim platform 1001 of a boat 1000 is depicted. Light $L_1$ and $L_2$ is depicting as emanating from the lighted surface apparatus 001 and as being viewable from the non-lit side of the lighted surface apparatus 001 so as to present any desired visual pattern or effect to a user disposed so as to view the lighted surface apparatus 001 from the non-lit side.

Still referring to FIGS. 1A, 1B, 2 and 4, in embodiments, surface covering 200 may be fixably attached to base structure 100 by any means known in the art such as chemical bonding, using adhesives such as pressure sensitive adhesive (PSA) films, roll-on adhesive, spray-on adhesives, or any other chemical bonding agent. Surface covering 200 may also be removably attached to base structure 100 by any means known in the art such as using snap fasteners, threaded fasteners, or any other kind of fastener. Surface covering 200 may also be removably attached to base structure 100 by sandwiching surface covering 200 between base structure 100 and another transparent or translucent sheet material.

At least one light source 301 may be disposed proximal to the base structure 100, second surface 102, such as by standoff distance G, such that light L radiating from the at least one light source, or plurality of light sources, 301 may radiate towards, and into, the base structure 100 second surface 102. In embodiments, the invention may comprise a plurality of light sources 301. The at least one light source 301 may be disposed in such a manner as to radiate all or a portion of light energy L in the direction of at least a portion of the base structure 100 second surface 102.

The base structure 100 may comprise a material that is able to pass at least a portion of incident light energy therethrough, and may be any translucent or transparent material, including but not limited to lexan or any polycarbonate. The base structure 100 may comprise a sheet material that is transmissive to light energy in the visible wavelength range, or any portion of the visible wavelength range. The surface covering 200 may have one or more voids 201 or 202 in the non-skid surface covering first surface 203, allowing at least some or all of the light energy L passing through base structure 100 to pass through the one or more voids 201 or 202 in the surface covering 200 so as to be visible to a user as light energy $L_1$ or $L_2$ viewing from a non-lit side of the base structure 100. The voids 201 and 202 may pass all the way through the non-skid surface covering 200, such as shown by void 202, which is a deep cutout, or even a through cutout, in surface covering 200, or they may only pass partially through the non-skid surface covering 200, such as shown by void 201 which is a shallow cutout that does not pass completely through surface covering 200. Voids 201 and 202 may be present in the surface covering 200 in any number, in any pattern, and in any combination so as to produce any desired visual effect or pattern as viewed from the non-lit side of the structure. Such desired visual effects may be purely decorative, may be informational, may be utilized as a trademark or other source-identifying mark, or for any other purpose. It is not necessary that the surface covering 200 comprise both types of voids; it may comprise either, neither, or both, types of voids 201 or 202, in any combination. The voids 201 and 202 may allow light to pass through them in varying degree, depending on any pigment present in the non-skid surface covering 200 material, the density of the material, the depth of voids 201 or 202, or other features of surface covering 200: for example, more light energy $L_2$ may pass through void 202 than may pass through void 201 $L_1$ because the light energy $L_1$ passing through void 201 must pass through a layer of non-skid surface covering material 200, of thickness $T_1$. It is not necessary that all voids 201 are characterized by the same thickness $T_1$, i.e., in any given embodiment, the voids $T_1$ may be of varying depth such that light energy $L_1$ may be varied from void to void, producing any desired visual pattern, design, or other effect as observed by a user from the non-lit side of the invention. In embodiments, the thickness of surface covering 200 $T_2$ may be of such thickness that very little, or no, light energy passes through it, but this is not a necessity. Thus the light energy $L_1$ and $L_2$ may form decorative light patterns when the system of the invention is used in low ambient light, such as at night, and decorative patterns formed by voids 201 or 202 may take on any desired pattern, logo, text or numerals, image, figure or other design element as may be desired.

Still referring to FIGS. 1A, 1B, 2 and 4, in embodiments, an optional light box housing 400 may fully or at least partially enclose the light sources(s) 301. The light box structure 400 may comprise an internal volume 402 for housing light sources 301 and may provide environmental protection for lighting sources 301, and may further comprise internal surfaces, at least one of which may be coated with a reflective coating for reflecting light energy towards the base structure 100 second surface 102. This may improve the light producing efficiency of the system as viewed from the non-lit side of the structure, requiring less electrical power to achieve a similar resulting energy at $L_1$ and $L_2$ as when the light box structure 400 is not present. This could be advantageous, for example, in an exemplary use case in which a boat is anchored out in a body of water with the engines off, i.e., not generating battery charging current, when users are utilizing a swim platform of the boat that comprises the lighting system and method of the invention. In such cases, the use of the housing or housing plus reflective interior coating may require less battery power to provide a given output of light. In such cases, extended battery life and extended swim time may be realized. Any of the embodiments of the invention may comprise optional light box structure 400 as described herein, in other words, the use of light box housing structure 400 is not limited to only the embodiments depicted in FIGS. 1A, 1B, 2 and 4. The light box housing 400 may comprise a periphery flange or other structure 401 that is in contact with and attached to the base structure second surface 102, forming a peripheral attachment between the second surface 102 of the base structure and the light box periphery flange 401. The attachment of the light box housing 400 to the base structure second surface 102 may form a watertight attachment such that water and other fluids are prevented from entering interior volume 402. The attachment may be fixed or removable, and may be made watertight by the use of compressible gaskets or other structures known in the art for creating a watertight seal.

Figure 3A:
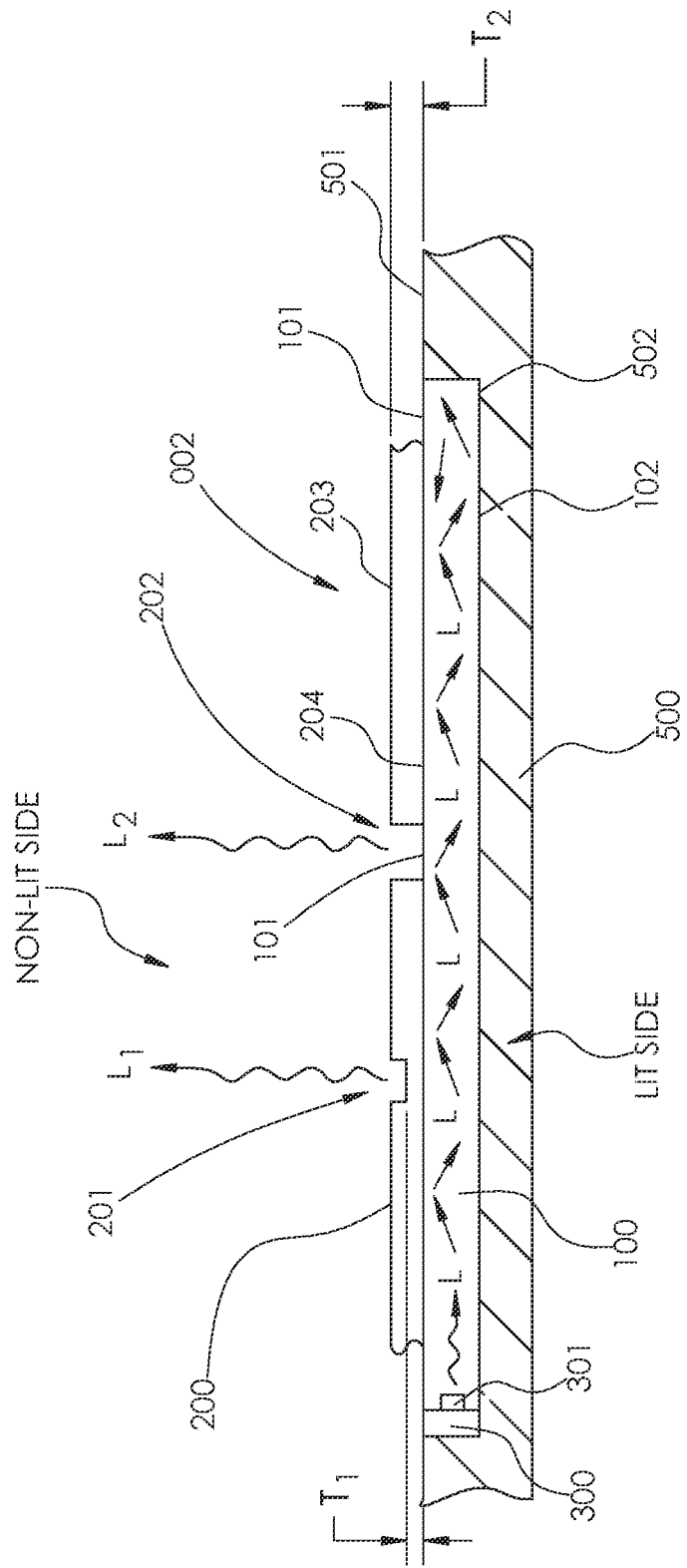
FIGS. 3A and 3B depict cross section views of edge-lit embodiments of the invention in which the light sources are disposed along an edge of the base structure.
Figure 3B:
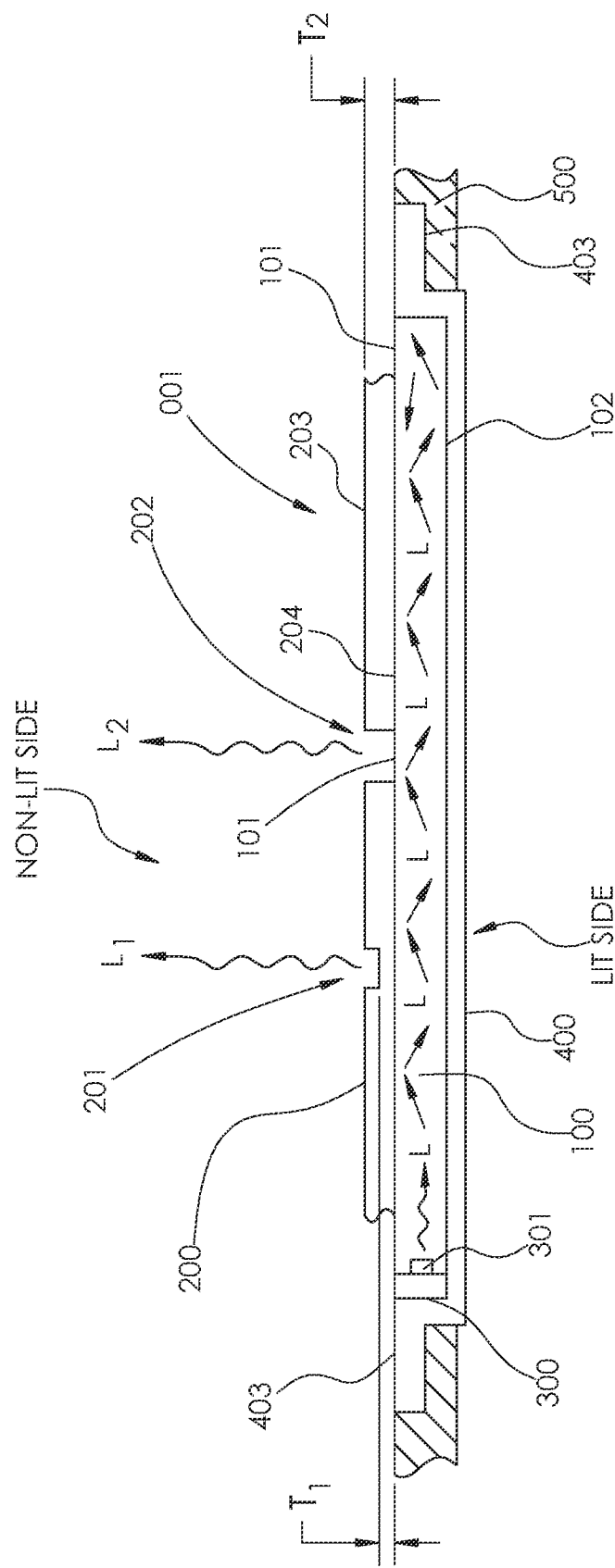
Figure 4:
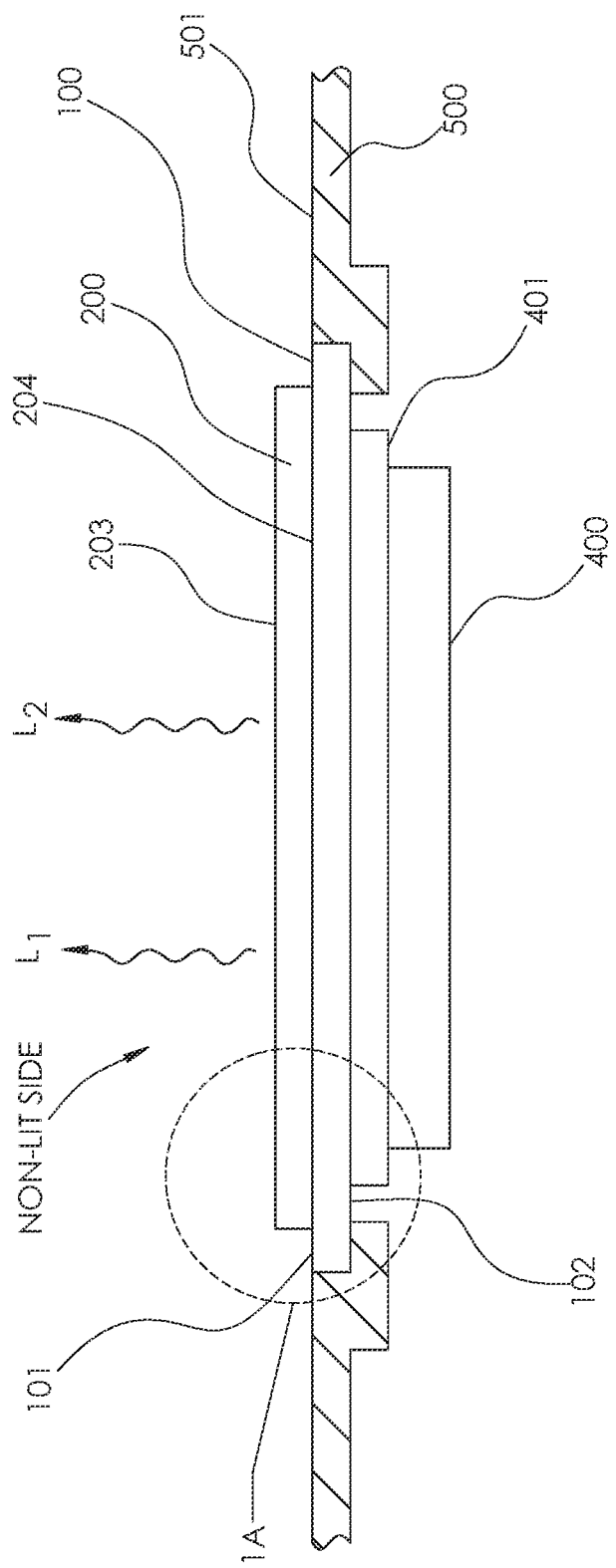
FIG. 4 depicts a side view of an embodiment of the invention in which the light sources are disposed within a light box that is adjacent to an underneath surface 102 of the base structure.

Referring now to FIGS. 3A and 3B, edge-lit embodiments of the system of the invention 002 are depicted. At least one, or a plurality of, light sources 301 may be disposed in a housing or other structure 300 along one or more edges of base structure 100 such that light energy L is radiated from the plurality of at least one light sources 301 into base structure 100, where it may be internally reflected in the light-transmissive or translucent material comprising base structure 100. Light L eventually exits the first surface 101 of base structure 100 in the areas of voids 201 or 202, or both, as $L_1$ or $L_2$, after being internally reflected. Light energy $L_1$ and $L_2$ emanate through voids 201 or 202 in surface covering 200 as hereinbefore described. Surfaces 101, 102, 203, 204, and 501 are depicted for reference. Likewise, thicknesses $T_1$ and $T_2$ are shown for reference. In embodiments, base structure 100 may be disposed in relationship to structure 500 such that base structure 100 first surface 101 is substantially flush with upper surface 501 of structure 500. Base structure 100 may be disposed on any surface of structure 500. In embodiments, base structure 100 may be disposed in a receiving recess 502 in receiving structure 500 as depicted in FIG. 3A. Alternatively the edge-lit embodiment may also comprise an optional light box 400 as depicted in FIG. 3B. Light box 400 may be removably or fixably attached to structure 500 by any means known in the art. In the exemplary embodiment depicted in FIG. 3A, light box 400 may be removably or fixably attached to structure 500 by use of fasteners, bonding or any other type of attachment, for example, at flanges 403.

Figure 5:
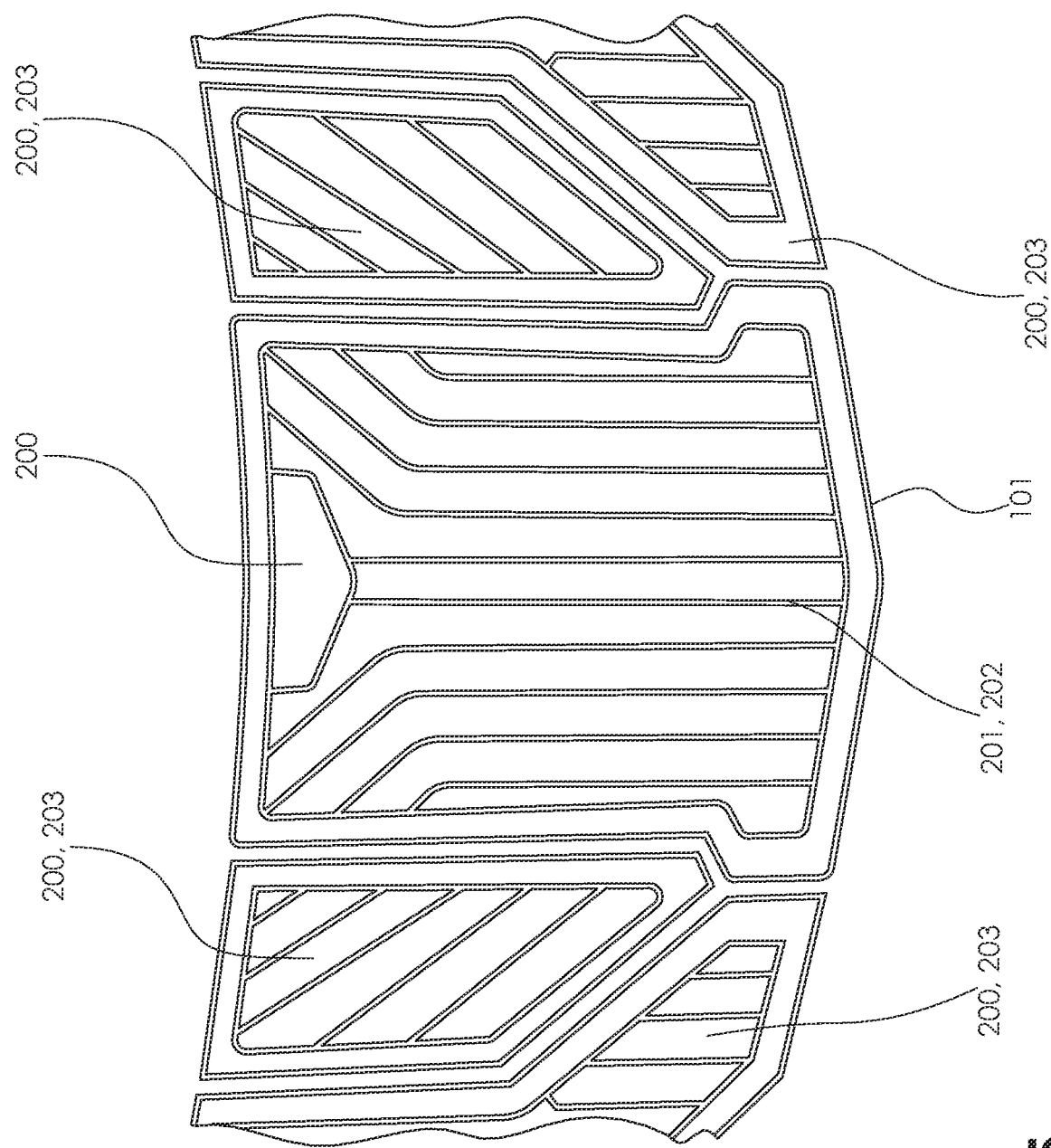
FIGS. 5-7 depict top views of embodiments of the invention, depicting various examples of decorative patterns formed by voids 201 and 202 in the first surface 203 of non-skid surface covering 200 of the invention.
Figure 6:
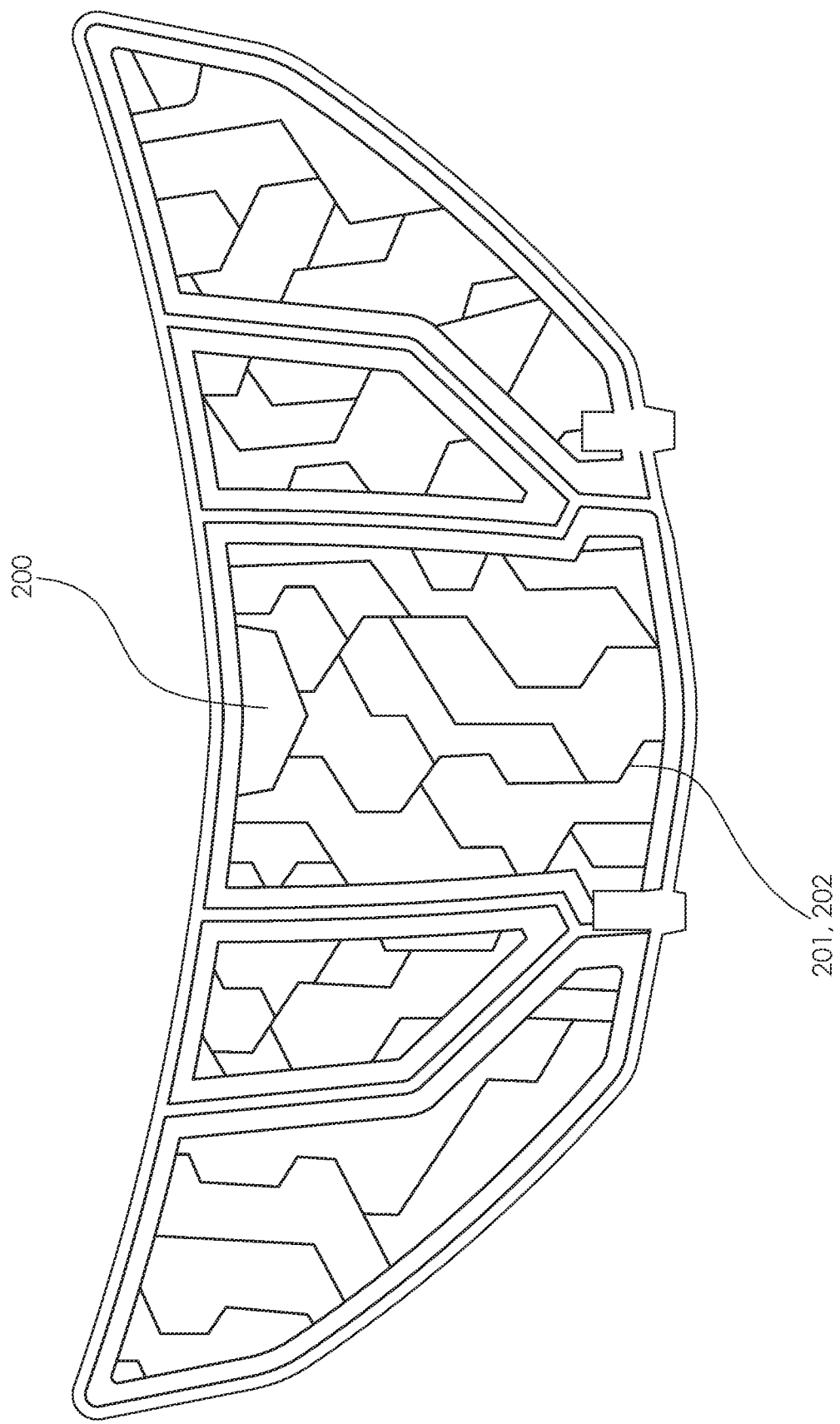
Figure 7:
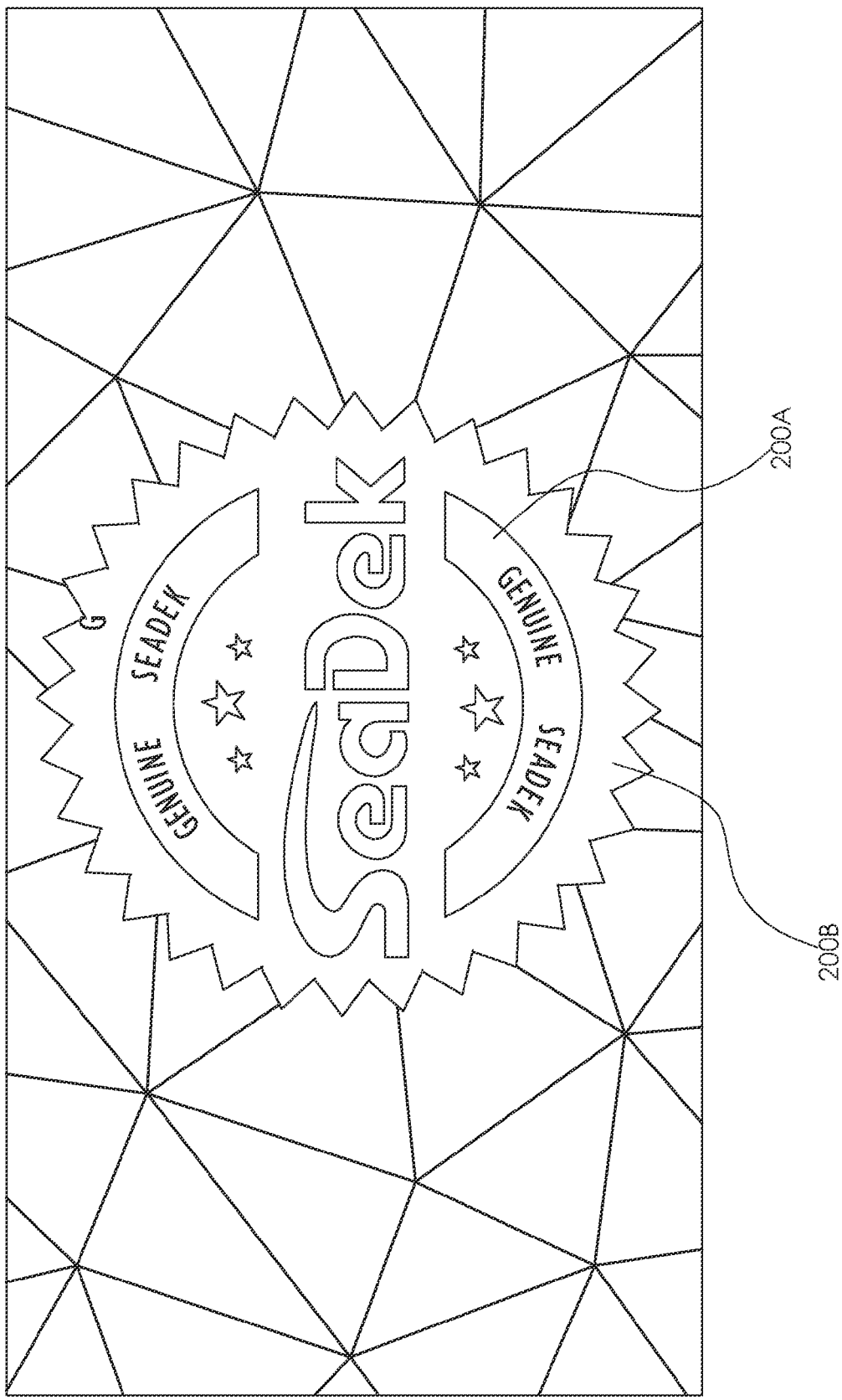

Referring now to FIGS. 5-7, top (i.e., from the non-lit side) views of various embodiments of the invention are depicted for the purpose of depicting examples of decorative patterns that may comprise the invention. As can be seen in FIGS. 5-7, any desired visual pattern may be formed by voids 201 and 202 in the first surface 203 of non-skid surface covering 200 of the invention 001. Further, in embodiments, any number of layers of material may form surface covering 200 such that additional visual effects may be achieved by routing through one or more layers comprising surface covering 200. Each of these layers comprising surface covering 200 may be of varying or similar colors, in any combination. Still further, surface covering 200 may comprise portions that are of different material color or texture. Thus the visual appearance of the lighted surface covering of the invention may be determined by the arrangement and depths of voids 201 and 202, a number of layers of material comprising surface covering 200 and the colors of each layer, the arrangement of portions of surface covering 200 and the color or texture, or both, of each portion, and any routing in surface covering 200 first surface 203. In FIG. 7, an example of desired visual effects is formed, in part, by the shape of the surface covering components 200A and 200B. In embodiments, the lighting apparatus, system and method of the invention may comprise any number of portions of surface covering components 200, such as depicted by surface covering components 200A and 200B.

Figure 8:
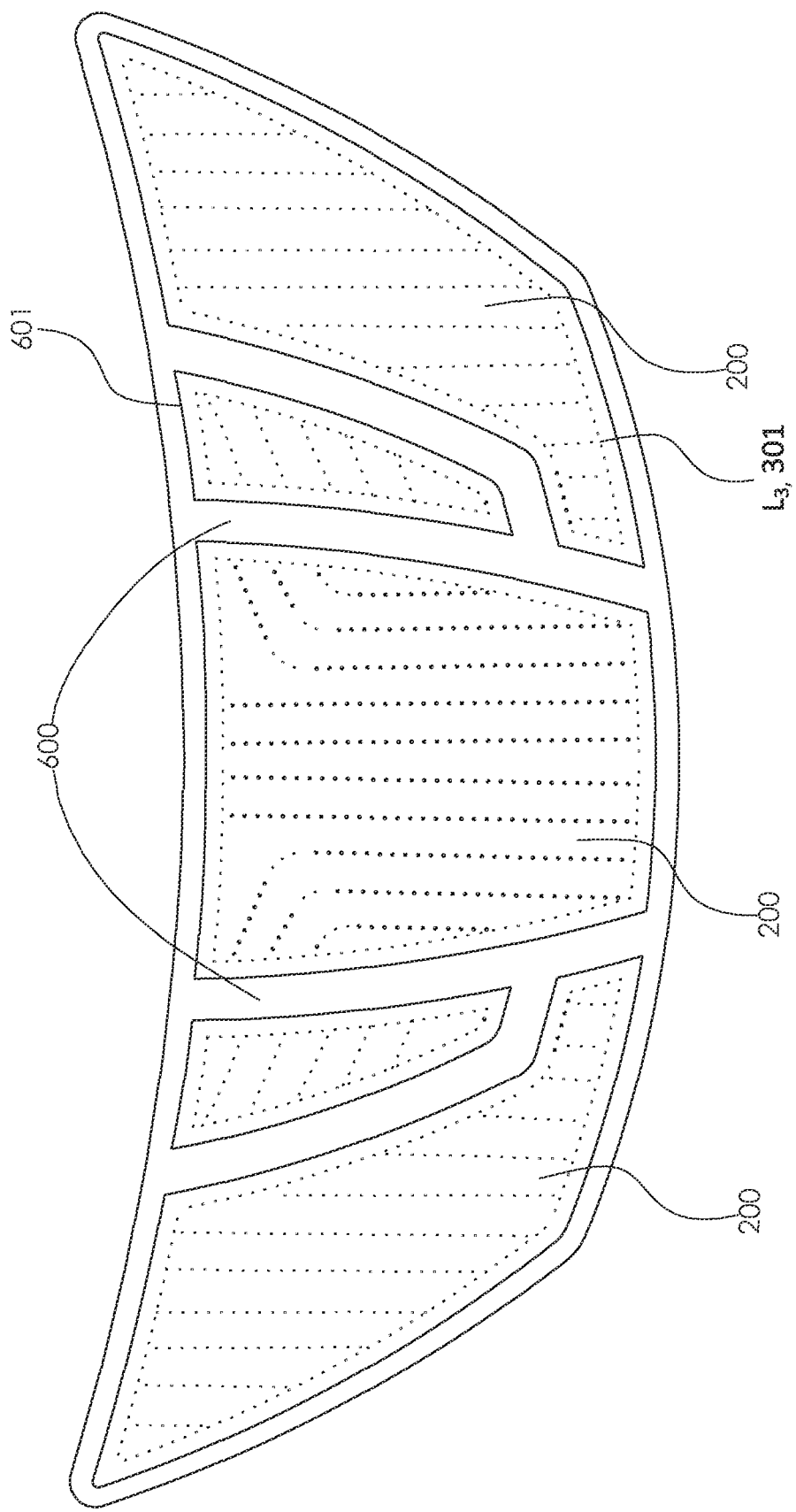
FIGS. 8 and 9 depict top views of an embodiment of the invention in which the light sources are disposed in cutouts in the second surface 204 of the non-skid surface covering 200, or are disposed proximal to an underneath surface of the base structure, and in which there are no voids 201 and 202 disposed in the first surface 203 of non-skid surface covering 200. In this embodiment of the invention, light L radiating from the light sources 301 is intense enough to pass through non-skid surface covering 200 such that it is visible from the non-lit side of the non-skid surface covering 200.
Figure 9:
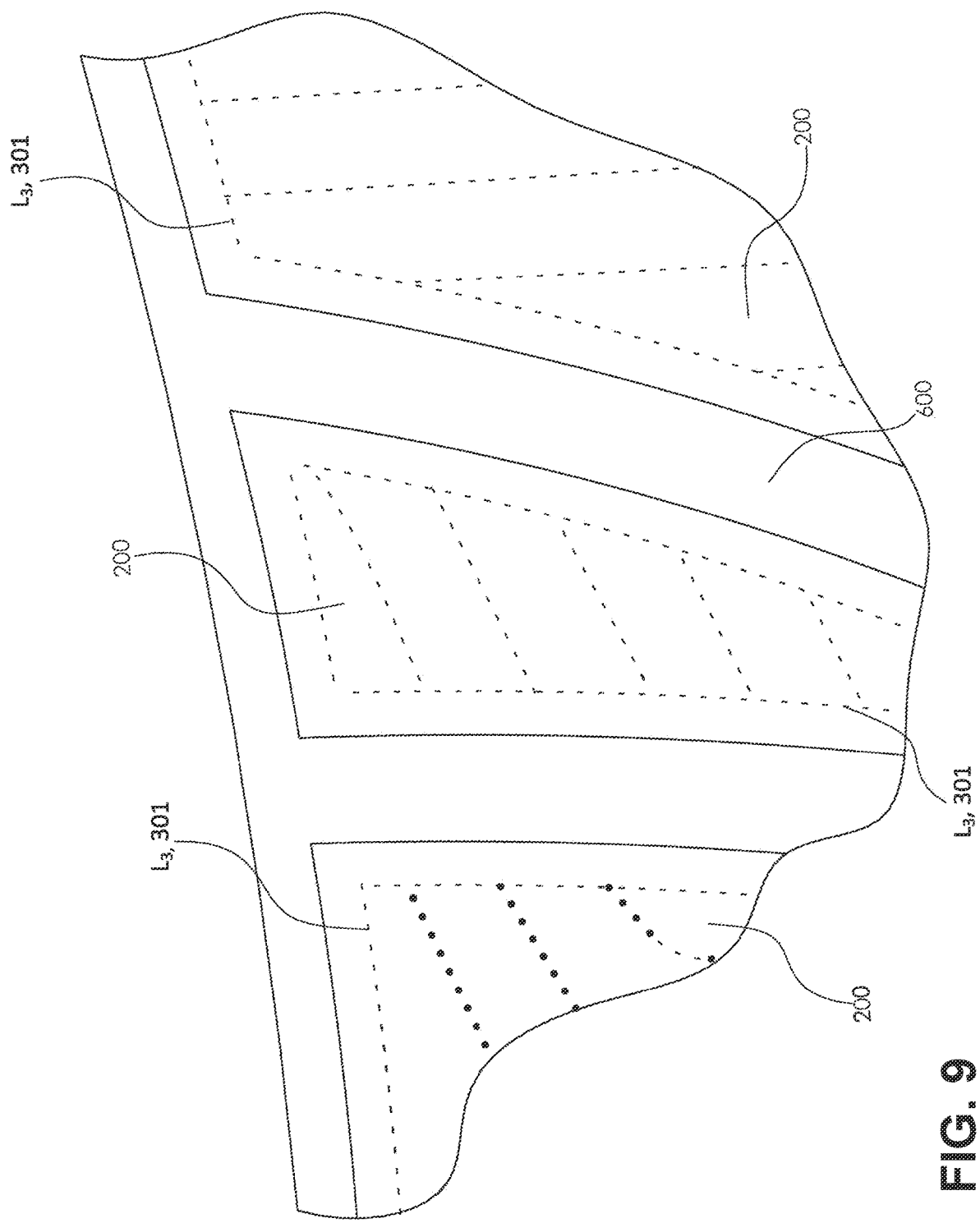

Referring now to FIGS. 8 and 9, top views of an embodiment of the invention in which the light sources are disposed in cutouts in the second surface 204 of the non-skid surface covering 200, or are disposed proximal to an underneath surface of the base structure 100, and in which there are no voids 201 and 202 disposed in the first surface 203 of non-skid surface covering 200, are depicted. In this embodiment of the invention, light $L_3$ radiating from the light sources 301 is intense enough to pass through non-skid surface covering 200 such that it is visible from the non-lit side of the non-skid surface covering 200. In the examples depicted, areas 600 are portions of surface covering material that are of a different color than the portions of surface covering 200 through which light $L_3$ emanates, and borders 601 have been created by routing through areas 200 and 600 to expose a dark material layer that is one of a plurality of material layers comprising surface covering 200, illustrating that the visual appearance of the lighted surface covering of the invention may be determined in part by the arrangement of portions of surface covering 200 and the color or texture, or both, of each portion, and any routing in surface covering 200 first surface 203.

Figure 10:
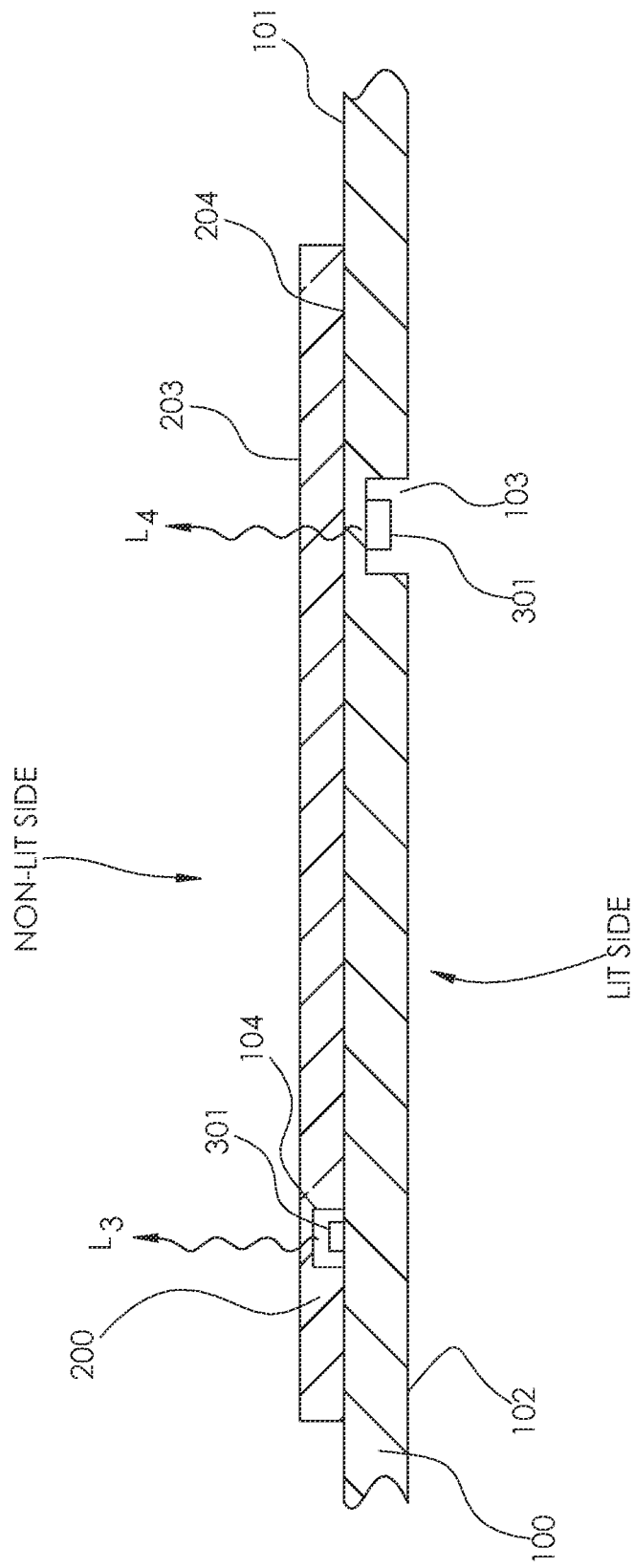
FIG. 10 depicts a cross section view of an embodiment of the invention in which the light sources are disposed in cutouts in the second surface 204 of the non-skid surface covering 200, or are disposed proximal to an underneath surface of the base structure 100 or in a cutout in base structure 100, and in which there are no voids 201 and 202 required to be disposed in the first surface 203 of non-skid surface covering 200. In this embodiment of the invention, light energy L radiating from the light source(s) 301 is intense enough to pass through non-skid surface covering 200 such that it is visible from the non-lit side of the non-skid surface covering 200.

Referring now to FIG. 10, a cross section view of an embodiment of the invention is depicted in which one or more light sources 301 are disposed in cutouts 104 in the second surface 204 of the non-skid surface covering 200, or are disposed proximal to an underneath surface of the base structure 100 or in a cutout 103 in base structure 100. In this embodiment, no voids 201 and 202 are required to be disposed in the first surface 203 of non-skid surface covering 200. In this embodiment of the invention, light L radiating from the light sources 301 is intense enough to pass through surface covering 200 as $L_3$ or $L_4$ such that it is visible from the non-lit side of the non-skid surface covering 200.

Figure 11:
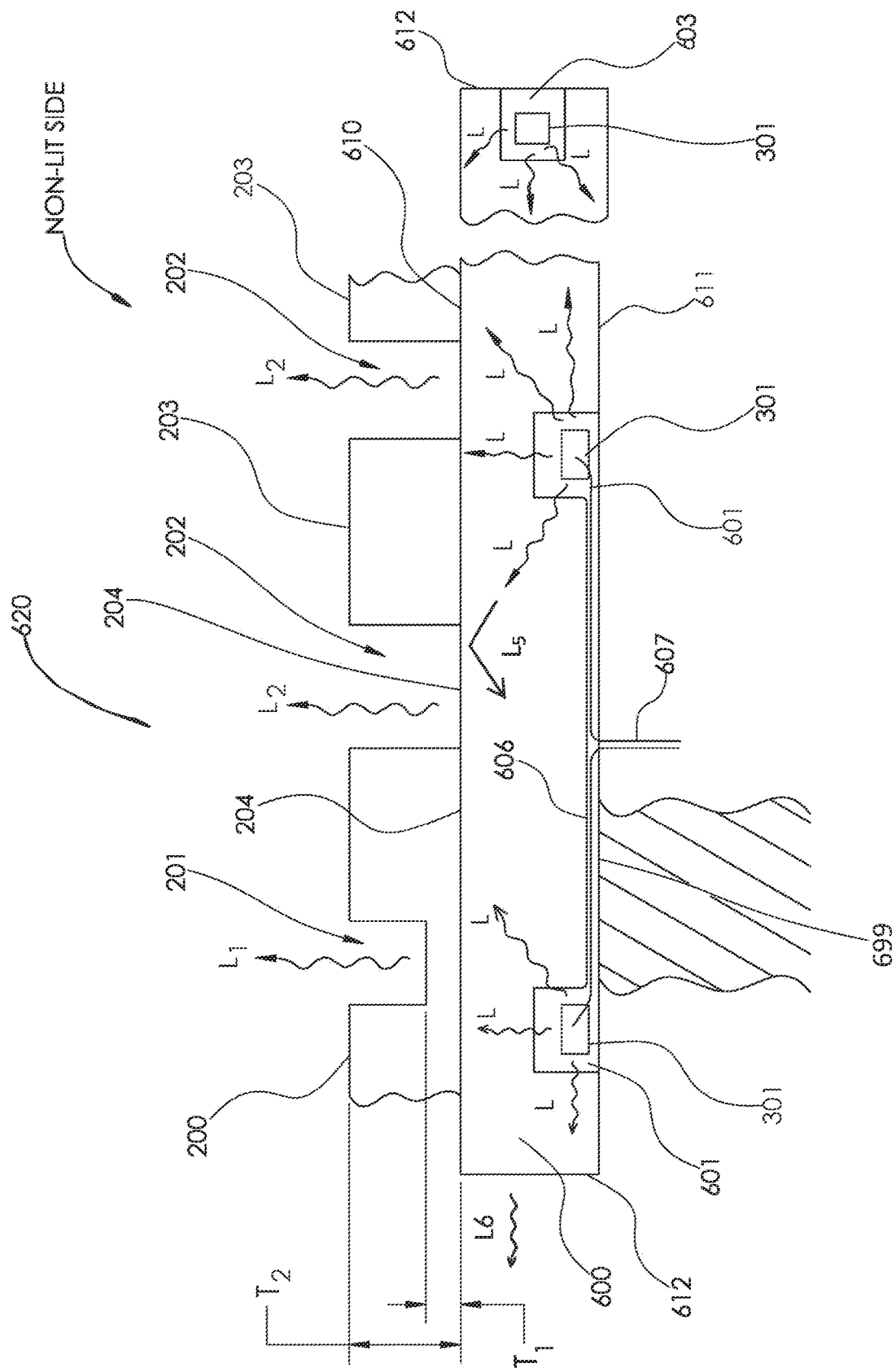
FIG. 11 depicts a productized lighted non-skid surface covering apparatus 620.
Figure 12:
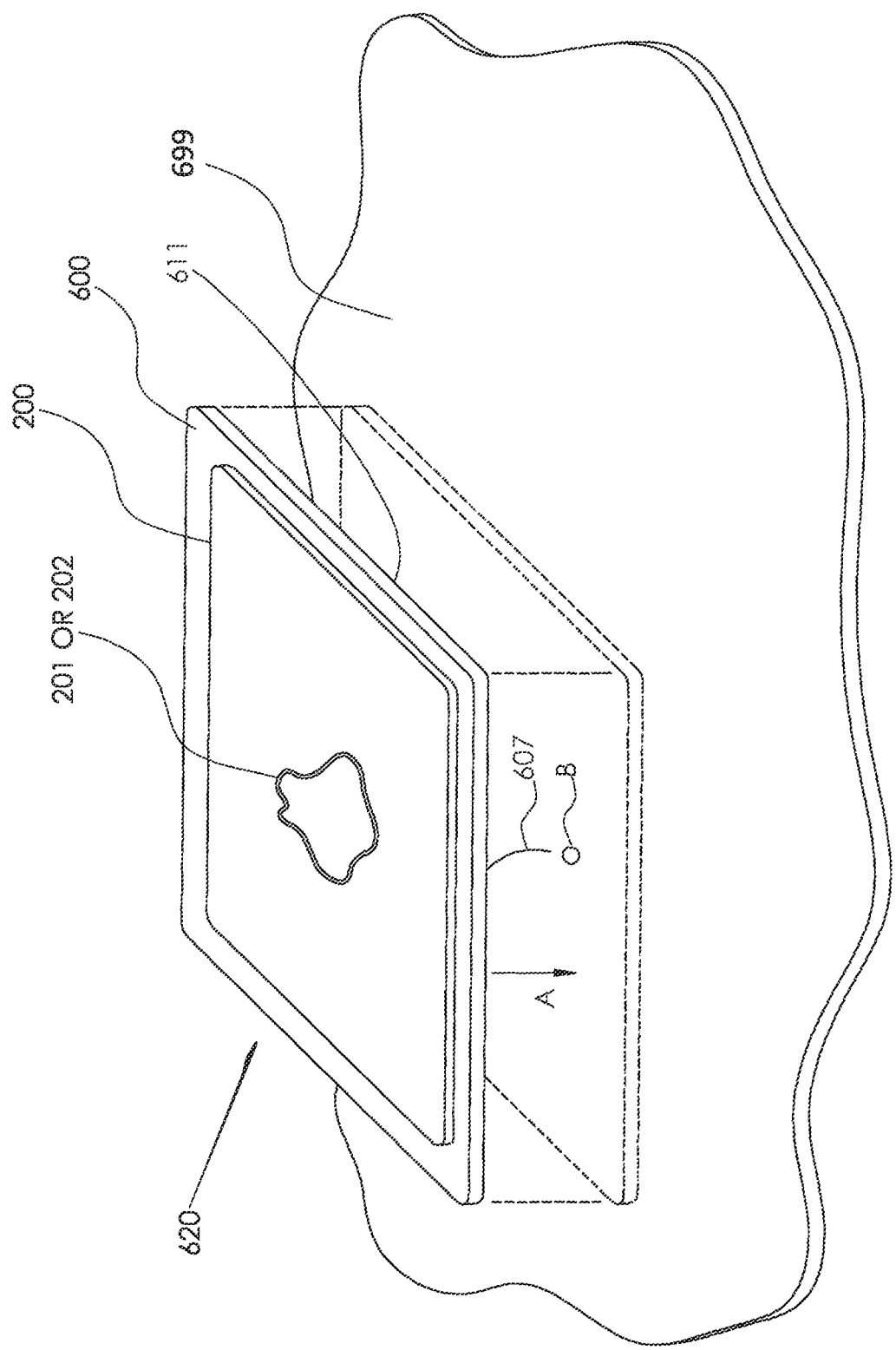
FIG. 12 depicts a productized lighted non-skid surface covering apparatus 620 as it is being assembled onto a desired surface.

Referring now to FIG. 11, an exemplary alternate embodiment of the invention is depicted in which a base structure 600 having a first surface 610, which may be an upper surface, and having one or more layers of non-skid surface covering 200 attached to first surface 610, comprises a productized lighted non-skid surface covering apparatus 620 that may be applied to any desired surface 500 (not shown in FIG. 11, but shown in FIG. 12). In this embodiment of the invention, the productized lighted non-skid surface covering apparatus 620 may be assembled to desired dimensions, with any desired number of routing of voids 201 or 202, or both, in any desired pattern, to create any desired lighting effect.

Still referring to FIG. 11, a base structure 600 comprising transparent or translucent material (in similar fashion to base structure 100) and having a first surface 610 and a second surface 611 that may form a part of a productized lighted non-skid surface covering apparatus 620. A surface covering 200 having a first surface 203 and a second surface 204 may be adjacent to, and may be attached to, the first surface 610 of base structure 600. The surface covering second surface 204 may be in nominal contact with, or may be attached to, the base structure 600 first surface 610. Base structure 600 may comprise one or a plurality of voids 601 in second surface 611 for receiving one or a plurality of light sources 301 such that light L radiating from the at least one light source(s) 301 may radiate towards, and into, the base structure 600. In embodiments, the invention may comprise a plurality of voids 601 and 603, and voids 601 and 603 may receive any number of light sources 301. The at least one light source(s) 301 may be disposed in such a manner as to radiate light energy L into at least a portion of the base structure 600. A portion of light energy L may be reflected internally in base structure 600 as depicted by $L_5$, and a portion of light energy L may exit base structure 600 along its edges or any of its surfaces, for example, second surface 204, or edge 612, as depicted by $L_6$. Voids 601 and 603 may be routed, molded, cast, machined, additively manufactured, or ablatively created (such as, for example, by laser techniques), or created by any other method known in the art, in base structure 600. Wiring 607 comprising electrical conductors may be received by one or more void(s) 606 in a surface of base structure 600 such as, for example, second surface 611. Wiring 607 may be in electrical communication with, and be utilized to provide electrical power to, light source(s) 301. Light source(s) 301 may be received by, and retained in, void(s) 601 and 603 by any means known in the art such as adhesive bonding, press fit, threaded fasteners, or any other means.

Still referring to FIG. 11, base structure 600 may comprise a material that is able to transmit light energy therethrough, such as any translucent or transparent material, including, for example, but not limited to, lexan or any polycarbonate. The base structure 600 may comprise a sheet material that is transmissive to light energy in the visible wavelength range. The surface covering 200 may have one or more surface voids 201 or 202 in the non-skid surface covering first surface 203, allowing at least some of the light energy L passing through the base structure to pass through the one or more surface voids 201 or 202 in the non-skid surface covering 200 so as to be visible to a user as light energy $L_1$ or $L_2$ viewing from a non-lit side of the base structure 600. The voids 201 or 202 may pass all the way through the non-skid surface covering 200, such as shown by void 202, which is a deep cut out in the non-skid surface covering 200, or they may only pass partially through the non-skid surface covering 200, which is a shallow cut out in the non-skid surface covering 200, such as shown by void 201. The voids 201 and 202 may be present in the non-skid surface covering 200 in any number, in any pattern, and in any combination. It is not necessary that the non-skid surface covering 200 comprise both types of voids 201 and 202; it may comprise either, neither, or both, types of void 201 or 202, in any combination, and in any number and shape. The voids 201 and 202 may allow light to pass through them in varying degree, depending on any pigment present in the non-skid surface covering 200 material, the density of the non-skid surface covering 200 material, the depth of voids 201 or 202, or other features of non-skid surface covering 200: for example, more light energy $L_2$ may pass through void 202 than may pass through void 201 because the light energy $L_1$ passing through void 201 must pass through a layer of surface covering material 200, of thickness $T_1$. It is not necessary that all voids 201 are characterized by the same thickness $T_1$, i.e., in any given embodiment, the voids $T_1$ may be of varying depth such that light energy $L_1$ may be varied from void to void, producing a desired visual pattern, design, or other effect as observed by a user from the non-lit side of the invention. In embodiments, the thickness of non-skid surface covering 200 $T_2$ may be of such thickness that very little, or no, light energy passes through it, but this is not a necessity. Thus the light energy $L_1$ and $L_2$ may form a desired decorative light pattern when the system of the invention is used in low ambient light, such as at night, and decorative patterns formed by voids 201 or 202 may take on any desired pattern, logo, text or numerals, image, figure or other design element as may be desired.

Still referring to FIG. 11, base structure 600 may comprise a void 603 extending along all or any portion of any of its edges 612 for retaining any number of light sources 301. As in voids 601 and 603, light sources 301 may radiate light energy L into base structure 600. The productized lighted non-skid surface covering apparatus 620 embodiment of the invention depicted in FIG. 11 may be attached to any desired surface or structure 700.

Referring now to FIG. 12, a productized lighted non-skid surface covering apparatus 620 embodiment of the invention depicted in FIG. 11 is depicted being removably or fixably attached onto a surface 699 of a receiving structure, which may be, for example, the surface of a boat, watercraft, jetski, kayak, spa, cooler, swim spa, pool, pool deck, vehicle surface, or any other surface for which it is desired to provide lighting. Second surface 611 of base structure 600 may be received by, and attached to, desired surface 699 of a receiving structure by any means known in the art such as, for example, and not by way of limitation, adhesive bonding, threaded fasteners, rivets, snap fasteners, or any other means of attachment known in the art. Surface 699 may comprise an opening B of any shape, but which may be, for example, a hole, for passing wiring 607 therethrough for connection to source of electrical power or to controller 700. The source of electrical power may be controlled to provide any desired lighting effect. Non-skid surface covering 200 may comprise any number, and any shape, of voids 201 or 202 as may be desired by a user. Such shapes may include decorative shapes, team logos, product logos or trademarks, or any other graphic, lettering or other elements as may be desired by a user. In use, the productized lighted non-skid surface covering apparatus 620 embodiment of the invention may be brought into contact with desired surface 699 by motivating the productized lighted non-skid surface covering apparatus 620 towards desired surface 699 as shown by arrow A, until surface 611 of base structure 600 is in contact with desired surface 699 along the broken lines depicting the placement of base structure 600 on surface 699 of a receiving structure. Electrical wiring 607 may be routed through opening B and may be connected to a source of electrical power for powering light sources 301 (not shown in FIG. 12), such that light sources 301 are in electrical communication with one or more sources of electric power via wiring 607. Preferably, the productized lighted surface covering apparatus 620 is then attached to desired surface 699 by any known means of attachment such as threaded fasteners, bonding or any other attachment means.

Figure 13:
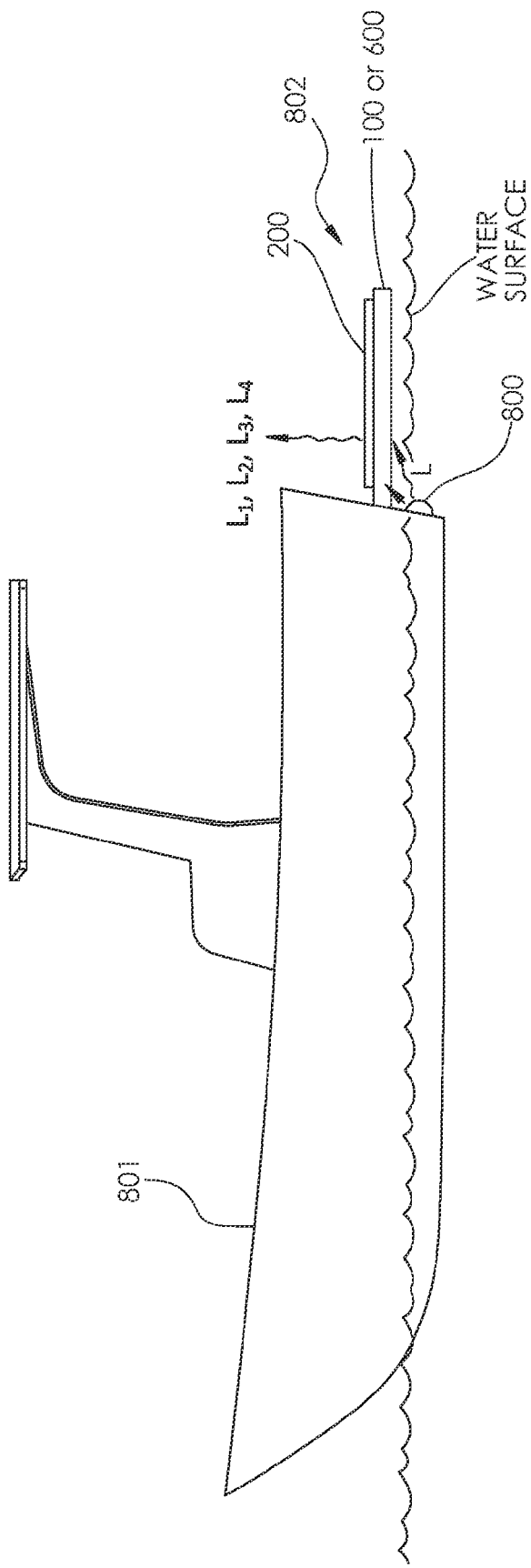
FIG. 13 depicts an embodiment of the invention adapted to utilize underwater lighting to assist in the backlighting effect, such as, by way of example, incorporating the backlighted apparatus into a boat swim platform.

Referring now to FIG. 13, an embodiment of the invention that is specifically applicable to boat swim platforms 802, other boat hull structures, or other floating structures such as floating docks is depicted. In this embodiment, the base structure 100 or lighted structure 600 may comprise at least a portion of a boat swim platform 802 or other floating structure that is proximal to the water. In these embodiments, light from underwater lighting 800, such as lighting mounted underneath the boat hull or swim platform, may provide the needed light energy for backlighting the non-skid surface covering 200 of the invention, when such underwater light energy L passes through base structure 100 or 600 up towards non-skid surface covering 200, passing through base structure 100 or 600 and emanating from voids 201 and 202 as described herein. Alternatively, in the embodiments in which the light box structure 400 is present, light box structure 400 itself may comprise translucent or transparent material, such that light energy L from under the swim platform or boat hull and deck structure is able pass from underneath the swim platform or boat hull and deck structure, through the light box structure 400, and through the base structure 100 or base structure 600, providing the desired backlighting of the non-skid surface covering 200. In such embodiments, base structure 100 or lighted structure 600 may form a part of the boat hull or swim platform structure.

Figure 14:
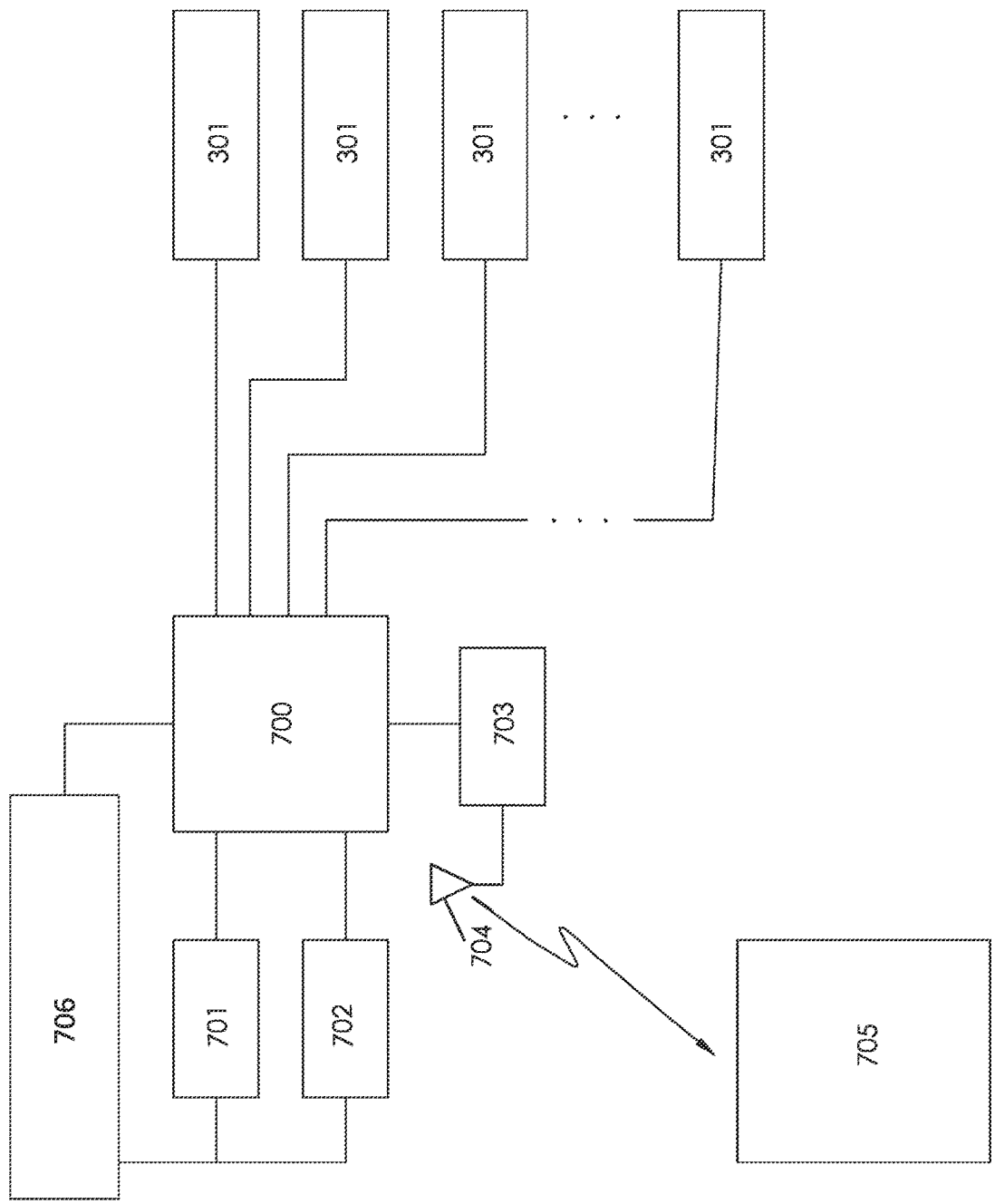
FIG. 14 depicts an exemplary embodiment of a block diagram of the electrical components of an embodiment of the invention.

Referring now to FIG. 14, in embodiments, the at least one light or plurality of source(s) 301 may be in communication with a source of electric power 706 such as a boat or spa electrical power system, battery, house electrical current or other electrical power source either directly or through a controller. In embodiments, such electrical power systems may comprise a rechargeable battery in communication with an alternator or generator that is part of a boat engine system, with wiring distributing electrical power to electrical components of the boat. The electrical wiring may be in electrical communication with and provide electrical power to a controller 700 and other circuit elements that are in turn in communication with the light sources 301 and may be operable to control the wavelength (i.e. the color) of light energy, or intensity of light energy, or both, that is radiated by the at least one light or plurality of sources 301. In embodiments, a user may input commands into a user interface 701, such as keyboard, keypad, touchscreen or other user input device that is in electrical communication with the controller 700 to control the wavelength and/or intensity of light radiated by the at least one light or plurality of sources 301. In embodiments, the light source(s) 301 may be a plurality of light sources. In embodiments, the at least one light source 301 may be a Light Emitting Diode (LED). In embodiments, the at least one light source 301 may be a laser diode or any other type of element or structure that radiates light energy. The user interface may be a wired or wireless control panel 701 located, for example, on the boat or spa, and having buttons, keyboard or touchscreen for receiving such user input; or, in embodiments, the control panel may be the user interface of a mobile device such as a cell or mobile smart phone or tablet 705 that is in wireless communication with the controller through transceiver 703 having an antenna 704 for transmitting and receiving radio frequency (RF) signals to mobile smart phone, device, or tablet 705, having a user interface such as a touch screen or microphone (in the case of voice commands) for receiving input from a user. The mobile device 705 may execute a set of non-transitory computer readable instructions stored in memory on the smart phone or tablet (i.e., may run a software application) to carry out the functions of receiving user input commands for controlling the lighting system of the invention as described herein and communicating those commands to controller 700 such that controller 700 controls the lighting system of the invention as described herein, as commanded by the user. The mobile device non-transitory computer readable instructions may also include instructions for receiving an audio input and sending control signals to the controller 700 for controlling the wavelength or intensity of the light radiated by the light source(s) 301 proportional to the audio signal. In this manner, the wavelength and/or intensity of the light radiated by the light sources may be controlled so as to be proportional to any audio signal such as, for example and not by way limitation, music. The controller 700 may, in embodiments, be in communication with one or more analog to digital convertors, or any circuit, that is operable to output an electrical signal that is in time with, or has a defined relationship to, an input signal such as an audio or other signal. In this manner, the light sources 301 may be controlled by controller 700 to vary intensity and color in coordinated fashion with an audio signal, which may be, for example, a music signal. The output electrical signal may be communicated to the controller. The controller 700 may be operable to control the wavelength or intensity of the output of light sources 301 such that the light observed by a user emanating from the non-lit side of the structure is seen to fluctuate or change, for example, with the beat of a music signal. In this manner, the light sources 301 may be controlled by controller 700 to vary intensity and color in coordinated fashion with an audio signal, which may be a music signal. The light sources may also be controlled by controller 700, for example, in any fashion desired by a user, for example changing color and intensity as desired or proportional to an input signal, turn off or on at certain times or upon certain events, and so on. The functions of the controller 700 may be carried out by the execution of computer-readable and executable instructions stored in physical memory, or media, 702, that is in communication with the controller 700. In this manner the controller 700 may be adapted to carry out the functions of controlling the light sources as described herein.

Figure 15:
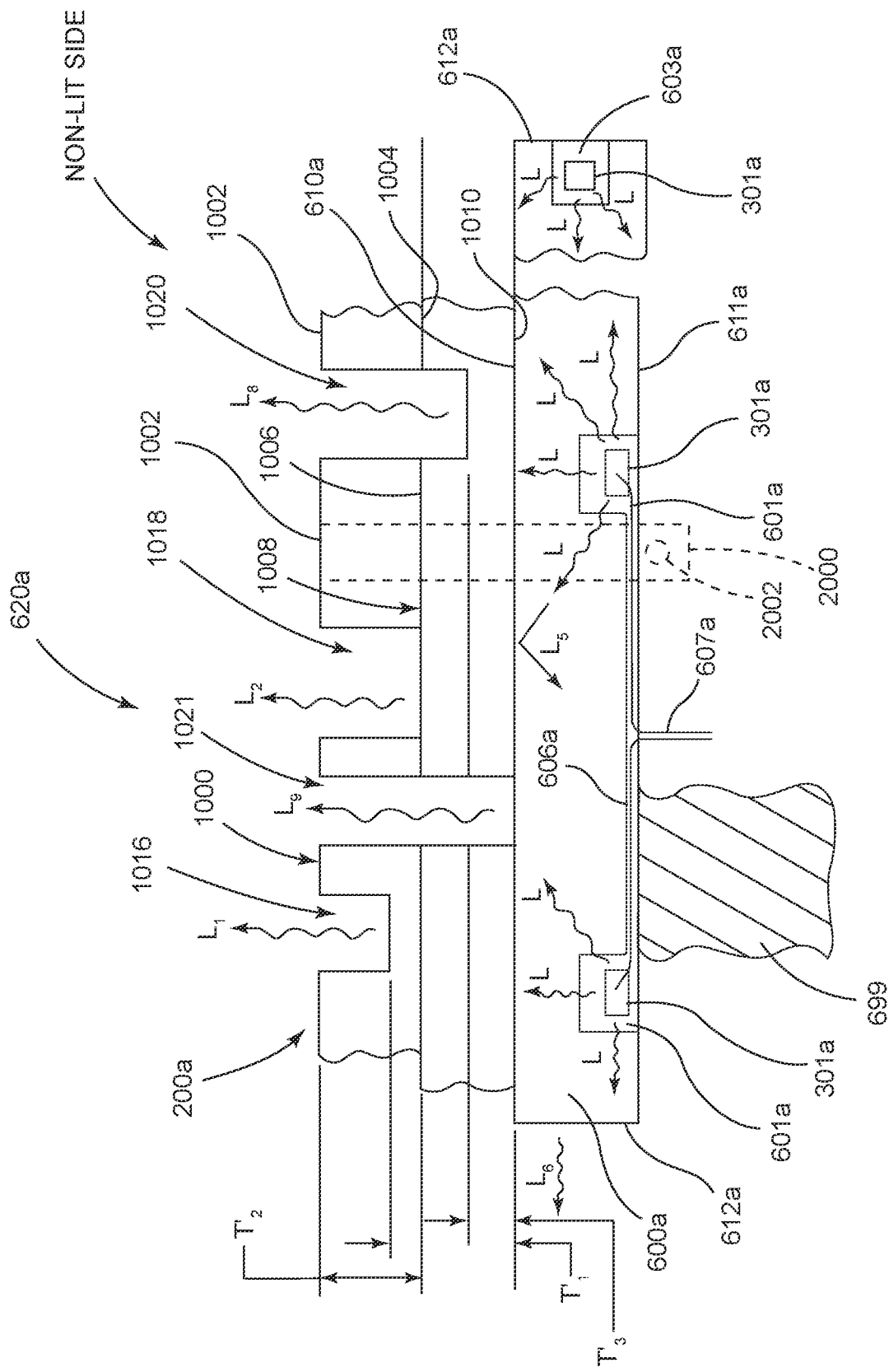
FIG. 15 depicts an alternative embodiment of the productized lighted non-skid surface covering apparatus.

Referring now to FIG. 15, another exemplary alternate embodiment of the invention is depicted in which a base structure 600a having a first surface 610a, which may be an upper surface, and having one or more layers of non-skid surface covering 200a attached to first surface 610a, comprises a productized lighted non-skid surface covering apparatus 620a that may be applied to any desired surface 699. In this embodiment of the invention, the productized lighted non-skid surface covering apparatus 620a may be assembled to desired dimensions, with any desired number of routing of voids 201a or 202a, or both, in any desired pattern, to create any desired lighting effect. Since the apparatus 620a is similar to previous described embodiments similar parts appearing in FIG. 15 and FIGS. 1-14 respectively are represented by the same, corresponding reference numeral, except for the suffix "a" in the numerals of the latter.

Still referring to FIG. 15, the base structure 600a comprising transparent or translucent material (in similar fashion to base structure 100) and having a first surface 610a and a second surface 611a that may form a part of a productized lighted non-skid surface covering apparatus 620a. A surface covering 200a includes a first surface covering layer 1000 having a first surface 1002 and a second surface 1004 may be adjacent to, and may be attached to a first surface 1006 of a second surface covering layer 1008, where a second surface 1010 of the second surface covering layer 1008 may be adjacent to, and may be attached to, the first surface 610a of base structure 600a. The second surface 1010 may be in nominal contact with, or may be attached to, the base structure 600a first surface 610a. The base structure 600a may comprise one or a plurality of voids 601a in the second surface 611a and one or a plurality of voids 603a in a side or edge surface 612a for receiving one or a plurality of light sources 301a such that light L radiating from the at least one light source(s) 301a may radiate towards, and into, the base structure 600a. In embodiments, the invention may comprise a plurality of the voids 601a, 603a, and the voids 601a, 603a may receive any number of light sources 301a similar to as discussed above. The at least one light source(s) 301a may be disposed in such a manner as to radiate light energy L into at least a portion of the base structure 600a. A portion of the light energy L may be reflected internally in the base structure 600a as depicted by $L_5$, and a portion of the light energy L may exit the base structure 600 along its edges or any of its surfaces, for example, the second surface 1002, or the edge 612a, as depicted by $L_6$. The voids 601a, 603a may be routed, molded, cast, machined, additively manufactured, or ablatively created (such as, for example, by laser techniques), or created by any other method known in the art, in the base structure 600a. Wiring 607a comprising electrical conductors may be received by one or more void(s) 606a in a surface of the base structure 600a such as, for example, the second surface 611a. The wiring 607a may be in electrical communication with, and be utilized to provide electrical power to, light source(s) 301a. The light source(s) 301a may be received by, and retained in, the void(s) 601a, 603a by adhesive bonding, press fit, threaded fasteners, or any other methods known in the art.

Still referring to FIG. 15, the base structure 600a may comprise a material that is able to transmit light energy therethrough, such as any translucent or transparent material, including, for example, but not limited to, lexan or any polycarbonate. The base structure 600a may comprise a sheet material that is transmissive to light energy in the visible wavelength range. The surface covering 1000 may have one or more surface voids 1016, 1018, 1020, 1021 in the non-skid surface covering first surface 1002, allowing at least some of the light energy L passing through the base structure to pass through the one or more surface voids 1016, 1018, 1020, 1021 in the non-skid surface covering 1000 so as to be visible to a user as light energy $L_1$, $L_2$, $L_8$, $L_9$ viewing from a non-lit side of the base structure 600a. The voids 1016, 1018, 1020, 1021 may pass partially through the non-skid surface covering 200a, which is a shallow cut out in first surface covering layer 1000 of the non-skid surface covering 200a, such as shown by void 1016, may pass all the way through the first surface covering layer 1000 of the non-skid surface covering 200a, such as shown by void 1018, which is a deep cut out in the non-skid surface covering 200a may pass entirely through the first surface cover layer 1000 and partially through the second surface cover layer 1008 of the non-skid surface covering 200a, such as shown by void 1020 or may pass entirely through the first surface covering layer 1000 and entirely through the second surface covering layer 1008 of the non-skid surface covering 200a, such as shown by void 2021. The voids 1016, 1018, 1020, 1021 may be present in the non-skid surface covering 200a in any number, in any pattern, and in any combination. It is not necessary that the non-skid surface covering 200a comprise any or all four types of voids 1016, 1018, 1020, 1021 in any combination, and in any number and shape. The voids 1016, 1018, 1020, 1021 may allow light to pass through them in varying degree, depending on any pigment present in the non-skid surface covering 200a material, the density of the non-skid surface covering 200a material, the depth of voids 1016, 1018, 1020, 1021 or other features of non-skid surface covering 200a: for example, more light energy $L_8$ may pass through void 1020 than light energy $L_2$ that may pass through void 1018 because the light energy passing through respective voids 1016, 1018, 1020, 1021 must pass through a layer or layers of surface covering material 200a, of thicknesses $T_3'$, $T_2'$, $T_1'$, or zero thickness.

Figure 16:
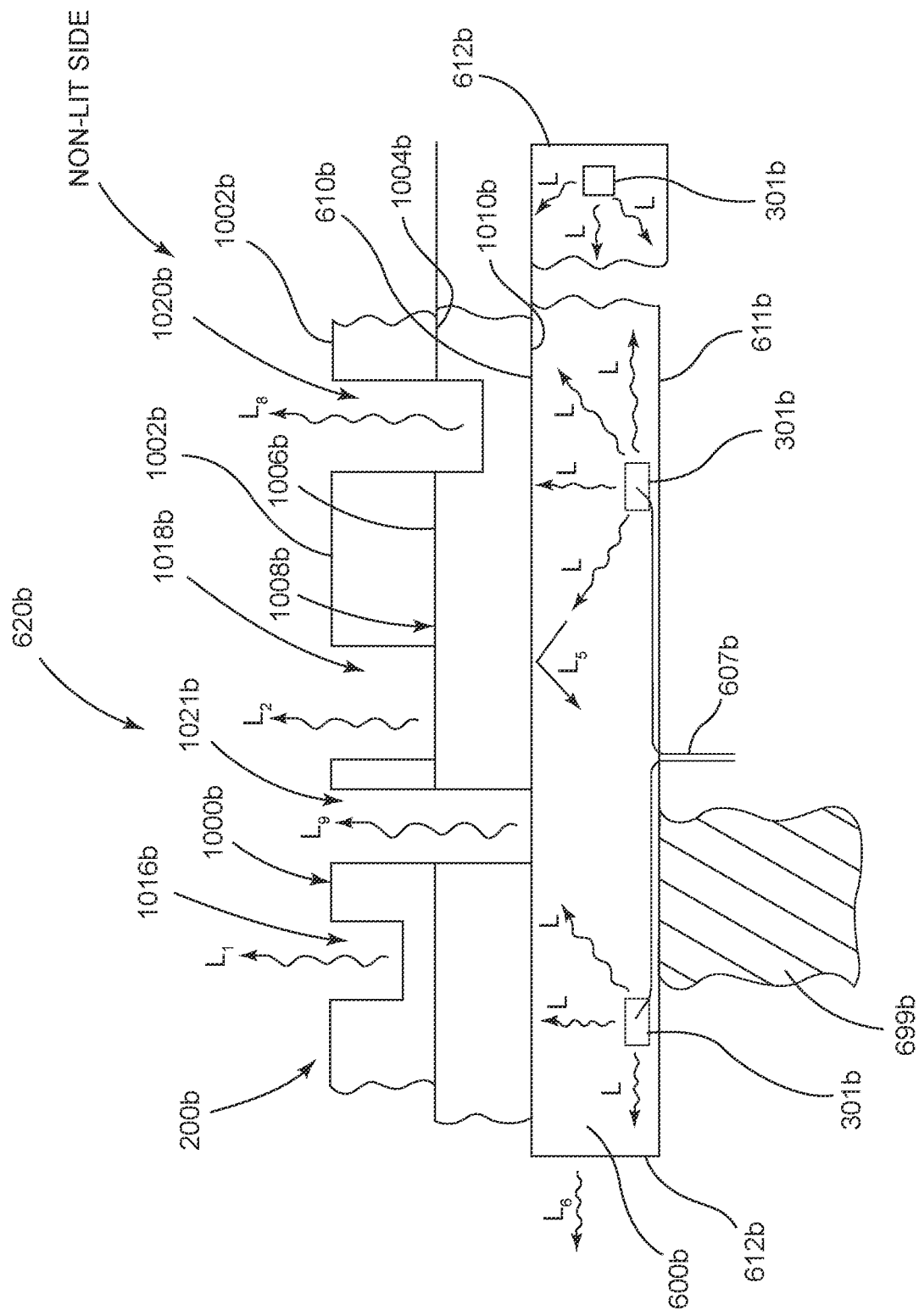
FIG. 16 depicts another alternative embodiment of the productized lighted non-skid surface covering apparatus.

The reference numeral 620b (FIG. 16) generally designates another embodiment of the productized lighted non-skid surface covering apparatus. Since the apparatus 620b is similar to the apparatus 620a, similar parts appearing in FIG. 15 and in FIG. 16 are respectively represented by the same, corresponding reference numeral, except for the suffix "b" in the numerals of the latter. The apparatus 620b is similar to the apparatus 620a with the most notable exception being the internal locating of the light sources 301b and the associated wires 606b within the base structure 600b which may be accomplished via in-molding, layer deposition such as 3-D printing, or other methods known in the art. In the illustrated example, the light sources 301b and wires 606b are completely encapsulated within the base structure 600b thereby protecting the light sources 301b and wires 606b from moisture, corrosion, physical damage, etc.

Figure 17:
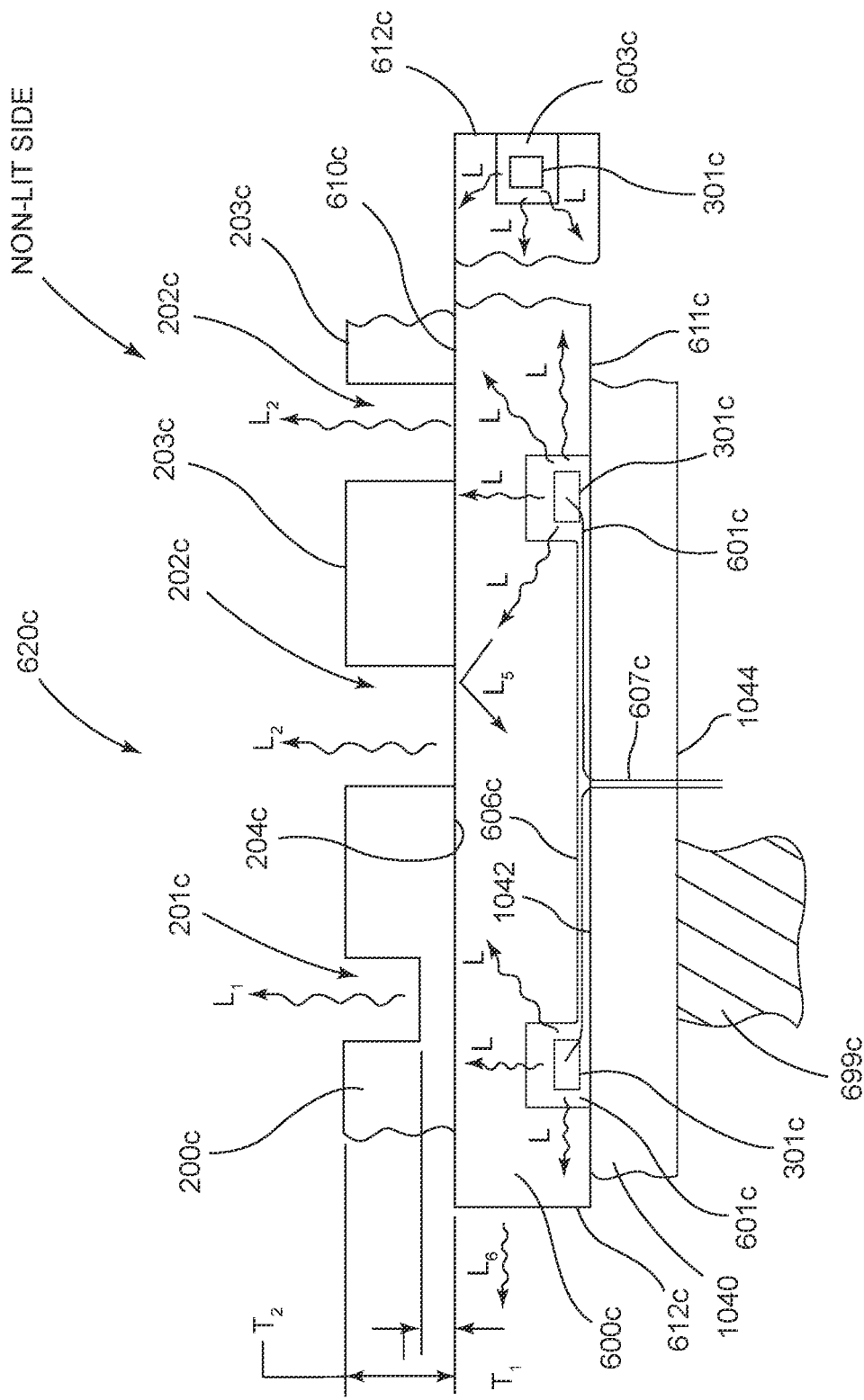
FIG. 17 depicts yet another alternative embodiment of the productized lighted non-skid surface covering apparatus.

Referring now to FIG. 17, another exemplary alternate embodiment of the invention is depicted in which a base structure 600c having a first surface 610c, which may be an upper surface, one or more layers of non-skid surface covering 200c attached to the first surface 610c, and a second surface covering 1040, comprises a productized lighted non-skid surface covering apparatus 620c that may be applied to any desired surface 699c. In this embodiment of the invention, the productized lighted non-skid surface covering apparatus 620c may be assembled to desired dimensions, with any desired number of routing of the voids 201c or 202c, or both, in any desired pattern, to create any desired lighting effect.

Still referring to FIG. 17, the base structure 600c may comprise a transparent or translucent material (in similar fashion to base structure 100) and have a first surface 610c and a second surface 611c that may form a part of a productized lighted non-skid surface covering apparatus 620c. A surface covering 200c having a first surface 203c and a second surface 204c may be adjacent to, and may be attached to, the first surface 610c of base structure 600c. The surface covering second surface 204c may be in nominal contact with, or may be attached to, the first surface 610c of the base structure 600c. The base structure 600c may comprise one or a plurality of voids 601c in the second surface 611c for receiving one or a plurality of light sources 301c such that the light L radiating from the at least one light source(s) 301c may radiate towards, and into, the base structure 600c. In embodiments, the invention may comprise a plurality of voids 601c, 603c, where the voids 601c, 603c may receive any number of light sources 301c. The at least one light source(s) 301c may be disposed in such a manner as to radiate the light energy L into at least a portion of the base structure 600c. A portion of the light energy L may be reflected internally in the base structure 600c as depicted by $L_5$, and a portion of the light energy L may exit base structure 600c along its edges or any of its surfaces, for example, the second surface 204c, or the edge 612c, as depicted by $L_6$. The voids 601c, 603c may be routed, molded, cast, machined, additively manufactured, or ablatively created (such as, for example, by laser techniques), or created by any other method known in the art, in the base structure 600c. Wiring 607c comprising electrical conductors may be received by one or more void(s) 606c in a surface of the base structure 600c such as, for example, the second surface 611c. The wiring 607c may be in electrical communication with, and be utilized to provide electrical power to, light source(s) 301c. The light source(s) 301c may be received by, and retained in, the void(s) 601c, 603c by adhesive bonding, press fit, threaded fasteners, or any other methods known in the art.

Still referring to FIG. 17, the base structure 600c may comprise a material that is able to transmit light energy therethrough, such as any translucent or transparent material, including, for example, but not limited to, lexan or any polycarbonate. The base structure 600c may comprise a sheet material that is transmissive to light energy in the visible wavelength range. The surface covering 200c may have one or more surface voids 201c, 202c in the non-skid surface covering first surface 203c, allowing at least some of the light energy L passing through the base structure 600c to pass through the one or more surface voids 201c, 202c in the non-skid surface covering 200c so as to be visible to a user as light energy $L_1$ or $L_2$ viewing from a non-lit side of the base structure 600c. The voids 201c, 202c may pass all the way through the non-skid surface covering 200c, such as shown by void 202c, which is a deep cut out in the non-skid surface covering 200c, or they may only pass partially through the non-skid surface covering 200c, which is a shallow cut out in the non-skid surface covering 200c, such as shown by void 201c. The voids 201c, 202c may be present in the non-skid surface covering 200c in any number, in any pattern, and in any combination. It is not necessary that the non-skid surface covering 200c comprise both types of the voids 201c, 202c; it may comprise either, neither, or both, types of the voids 201c, 202c, in any combination, and in any number and shape. The voids 201c, 202c may allow light to pass through them in varying degree, depending on any pigment present in the non-skid surface covering 200c material, the density of the non-skid surface covering 200c material, the depth of the voids 201c, 202c, or other features of non-skid surface covering 200c: for example, more light energy $L_2$ may pass through void 202c than may pass through void 201c because the light energy $L_1$ passing through void 201c must pass through a layer of surface covering material 200c, of thickness $T_1$. It is not necessary that all voids 201c are characterized by the same thickness $T_1$, i.e., in any given embodiment, the voids $T_1$ may be of varying depth such that light energy $L_1$ may be varied from void to void, producing a desired visual pattern, design, or other effect as observed by a user from the non-lit side of the invention.

The second surface covering 1040 may include a first surface 1042 secured to the second surface 611c of the base structure 600c via adhesive bonding, chemical bonding, heat welding, separate mechanical fasteners, and the like. A second surface 1044 of the second surface covering 1040 is configured to be secured to the desired surface 699c via an adhesive, chemical bonding, magnets, separate mechanical fasteners, hook-and-loop type fasteners and the like. The second surface covering 1040 preferably comprises EVA foam, PE foam and/or EPDM. Further, the second surface covering 1040 may be configured as a non-slip surface thereby allowing the arrangement 620c to be utilized with the desired surface 699c without temporarily or permanently attaching the apparatus 620c to the surface 699c.

Figure 18:
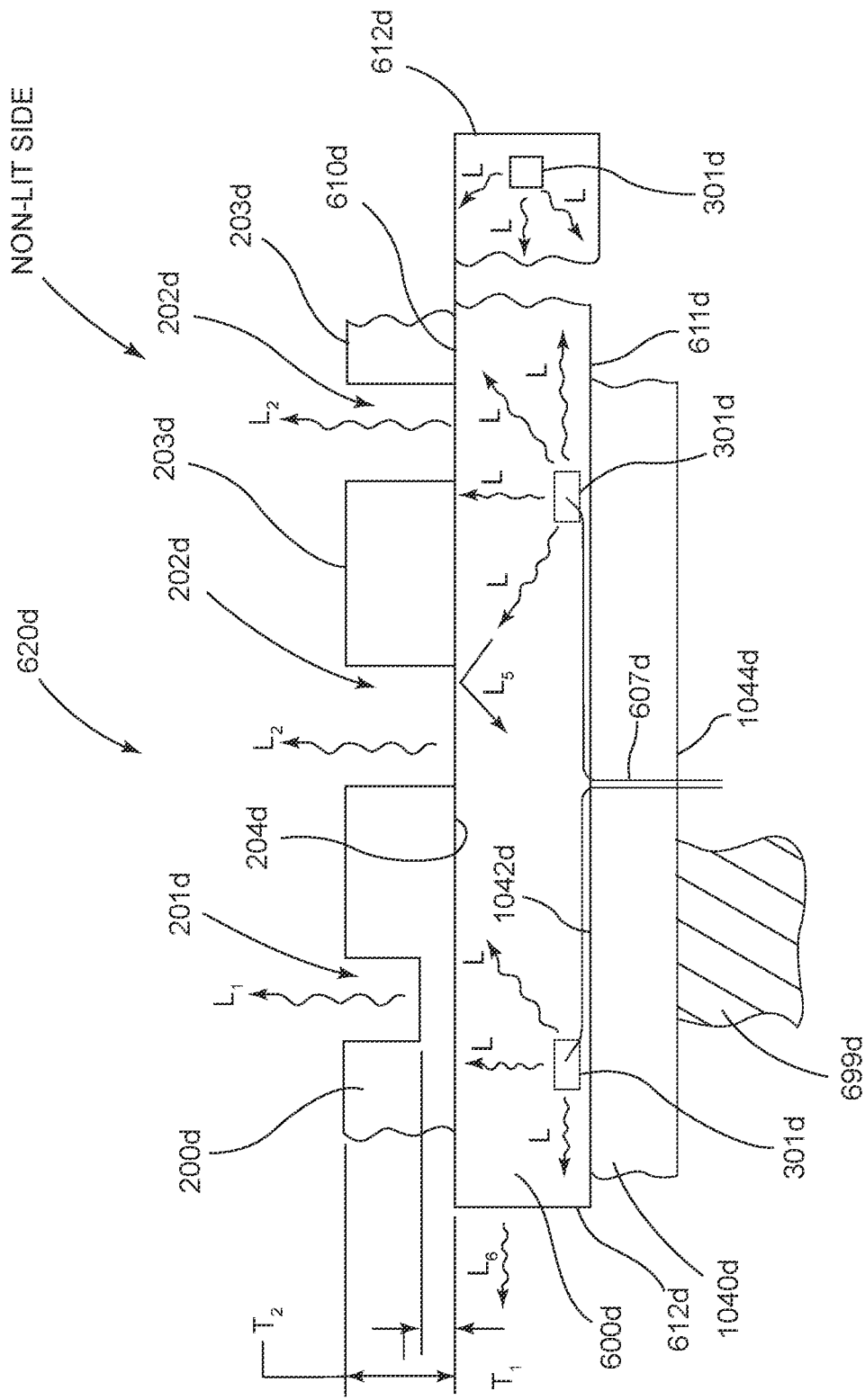
FIG. 18 depicts still yet another alternative embodiment of the productized lighted non-skid surface covering apparatus.

The reference numeral 620*d* (FIG. 18) generally designates another embodiment of the productized lighted non-skid surface covering apparatus. Since the apparatus 620*d* is similar to the apparatus 620*c*, similar parts appearing in FIG. 17 and in FIG. 18 are respectively represented by the same, corresponding reference numeral, except for the suffix "d" in the numerals of the latter. The apparatus 620*d* is similar to the apparatus 620*c* with the most notable exception being the internal locating of the light sources 301*d* and the associated wires 606*d* within the base structure 600*d* which may be accomplished via in-molding, layer deposition such as 3-D printing, or other methods known in the art. In the illustrated example, the light sources 301*d* and wires 606*d* are completely encapsulated within the base structure 600*d* thereby further protecting the light sources 301*d* and wires 606*d* from moisture, corrosion, physical damage, etc.

In embodiments, the single or multiple layer of the surface covering material may be a material comprising EVA or PE foam, EPDM, or any other desired surface covering material. Preferably, but not necessarily, surface covering material may comprise materials that are able to be routed by standard routing machinery and techniques, such as hand routers and CNC routers.

In embodiments, voids of the various embodiments need not be present. In these embodiments, the light energy L radiating from the at least one light source(s) may be of sufficient intensity to pass through non-skid surface covering so as to be visible from a non-lit side of the invention, or around edges of non-skid surface covering, or along edges of the transparent or translucent material comprising the invention.

In embodiments, the receiving structure(s) may be any structure or surface, including but not limited to, for example, a boat structure or surface, a vehicle structure or surface, a recreational vehicle structure or surface, a golf cart structure or surface, a building structure or surface, a paddleboard structure, a jet ski structure, a pool structure or surface, a spa structure or surface, an architectural structure or surface, or any other structure or surface that is desired to be lighted.

In embodiments, the surface covering may be attached to a surface of the base or lighting structure by adhesive bonding, fastening straps including, for example, a strap 2000 and snap fasteners 2002 (FIG. 15), configured to snap-couple with a complimenting snap-couple attached to a surface of the object to which the overall arrangement is to be attached or any other type of attaching method.

In embodiments, and various use cases, the lighted apparatus of the invention may be formed as a flat planar structure, or may be formed into any desired three-dimensional shape by any known method, such as, for example, thermoforming, machining, casting, additive manufacture, etc. While the exemplary embodiments depicted in the drawings depict planar surfaces, this is for ease of explanation only.

In embodiments, a plurality of backlighted surface covers of the invention may be linked or connected together in segments to form a complete assembly providing coverage of a desired area of any outline, size, shape or three-dimensional configuration. This approach may be practical for larger surfaces such as large pool decks or boat decks. In other applications, this approach is practical to cover structures that have, for example, a shape requiring multiple segments of the backlighted surface cover apparatus of the invention, such as, by way of example, a spa comprising a plurality of surfaces that are not co-planar that are desired to be covered. In this manner the light elements of the assembly of individual backlight sections may be controlled to provide a desired coordinated visual lighting effect.

In embodiments it is not necessary that the base structure 100 be a sheet structure. The base structure may take any three-dimensional shape, including but not limited to spherical shapes, pyramid shapes, cylinder shapes, cone shapes, triangular prizm shapes, square pyramid shapes, cuboid shapes, cube shapes, tetrahedron shapes and other three dimensional shapes. The light sources may be located in any position so as to illuminate a portion of base structure 100 with light energy.

In the various embodiments, any of the described features or elements of the invention may be present in any combination, and in any number. It is not necessary that each and every described feature and element be present in each embodiment of the invention, or that any particular embodiment of the invention comprise only features of one type or another. Thus, the various features of the invention may be mixed in any embodiment, may be present in any number, or may not be present.

The invention claimed is:

1. A lighting system, comprising:
a base structure having a first surface and a second surface, said base structure comprising a transparent or translucent material;
a surface covering including a first surface layer having a first surface and a second surface and a second surface layer having a first surface facing the second surface of the first surface layer and a second surface facing the first surface of the base structure; and
at least one light source disposed so as to illuminate at least a portion of the base structure with light energy such that at least a portion of the light energy passes through the at least a portion of the base structure and into the surface covering;
wherein the surface covering comprises at least one void extending at least partially between the first surface of the first surface layer and the second surface of the second surface layer where the at least one void is configured to allow at least some of the light energy passing through the base structure to pass through the one void and emanate from the first surface of the first surface layer of the surface covering to create a desired visual effect; and
wherein the at least one void is open to the first surface of the first surface layer.

2. The lighting system of claim 1, wherein the at least one void extends completely between the first surface of the first surface layer and the second surface of the second surface layer.

3. The lighting system of claim 1, wherein the at least one void extends only partially from the first surface of the first surface layer toward the second surface of the second surface layer.

4. The lighting system of claim 1, wherein the at least one void extends entirely from the first surface of the first surface layer to the second surface of the first surface layer.

5. The lighting system of claim 1, wherein the at least one void includes a first void extending a first distance between the first surface of the first surface layer and the second surface of the second surface layer and a second void extending a second distance between the first surface of the first surface layer and the second surface of the second surface layer, and wherein the second distance is different than the first distance.

6. The lighting system of claim 1, wherein the at least one light source is embedded within the base structure.

7. The lighting system of claim 1, wherein the base structure comprises at least one of polycarbonate, polypropylene and acrylic.

8. The lighting system of claim 1, wherein at least one of the first surface layer and the second surface layer comprises at least one of EVA foam, PE foam and EPDM.

9. The lighting system of claim 1, wherein the first surface layer and the second surface layer are translucent.

10. The lighting system of claim 1, wherein the second surface of the second surface layer is attached to the first surface of the base structure via an adhesive.

11. The lighting system of claim 1, wherein the second surface of the first surface layer is attached to the first surface of the second surface layer via an adhesive.

12. The lighting system of claim 1, further comprising:
an adhesive configure to secure the lighting system to a supporting structure of a vehicle.

13. The lighting system of claim 1, further comprising:
an attachment arrangement configured to releasably attach the lighting system to a supporting structure.

14. The lighting system of claim 13, wherein the attachment arrangement includes a snap assembly.

15. The lighting system of claim 1, wherein at least one of the first surface layer and the second surface layer is translucent.

16. A surface cover for covering a surface of a marine vehicle, comprising:
the lighting system of claim 1; and
an adhesive securing the surface cover to the surface of the marine vehicle.

17. A lighting system, comprising:
a surface covering including a first surface layer having a first surface and a second surface and a second surface layer having a first surface and a second surface;
a base structure having a first surface facing the second surface of the first surface layer and a second surface facing the first surface of the second surface layer, the base structure comprising a transparent or translucent material; and
at least one light source disposed so as to illuminate at least a portion of the base structure with light energy such that at least a portion of the light energy passes through the at least a portion of the base structure and into the first surface layer of the surface covering;
wherein the first surface layer of the surface covering comprises at least one void extending at least partially between the first surface of the first surface layer and the second surface of the first surface layer where the at least one void is configured to allow at least some of the light energy passing from the at least a portion of the base structure to pass through the at least one void and emanate from the first surface of the first surface layer of the surface covering to create a desired visual effect; and
wherein the at least one void is open to the first surface of the first surface layer.

18. The lighting system of claim 17, wherein least one of EVA foam, PE foam and EPDM.

19. The lighting system of claim 17, wherein the second covering layer comprises at least one of EVA foam, PE foam and EPDM.

20. The lighting system of claim 17, wherein the at least one void extends completely between the first surface of the first surface layer and the second surface of the first surface layer.

21. The lighting system of claim 17, wherein the at least one void extends only partially from the first surface of the first surface layer toward the second surface of the first surface layer.

22. The lighting system of claim 17, wherein the at least one void includes a first void extending a first distance between the first surface of the first surface layer and the second surface of the second surface layer and a second void extending a second distance between the first surface of the first surface layer and the second surface of the first surface layer, and wherein the second distance is different than the first distance.

23. The lighting system of claim 17, wherein the at least one light source is embedded within the base structure.

24. The lighting system of claim 17, wherein the base structure comprises at least one of polycarbonate, polypropylene and acrylic.

25. The lighting system of claim 17, wherein the second surface of the first surface layer is attached to the first surface of the base structure via an adhesive.

26. The lighting system of claim 17, wherein the second surface of the base structure is attached to the first surface of the second surface layer via an adhesive.

27. The lighting system of claim 17, further comprising:
an attachment arrangement configured to releasably attach the lighting system to a supporting structure.

28. The lighting system of claim 27, wherein the attachment arrangement includes a snap assembly.

29. The lighting system of claim 17, wherein at least one of the first surface layer and the second surface layer is translucent.

30. A surface cover for covering a surface of a marine vehicle, comprising:
the lighting system of claim 17; and
an adhesive securing the surface cover to the surface of the marine vehicle.

31. The lighting system of claim 17, further comprising:
an adhesive configured to secure the lighting system to a supporting structure of a vehicle.

* * * * *